(12) United States Patent
Phillips

(10) Patent No.: US 12,301,955 B2
(45) Date of Patent: *May 13, 2025

(54) SYSTEMS AND METHODS FOR EFFICIENT MANAGEMENT OF RESOURCES FOR STREAMING INTERACTIVE MULTIMEDIA CONTENT

(71) Applicant: Adeia Guides, Inc., San Jose, CA (US)

(72) Inventor: Christopher Phillips, Hartwell, GA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/384,074

(22) Filed: Oct. 26, 2023

(65) Prior Publication Data

US 2024/0129597 A1 Apr. 18, 2024

Related U.S. Application Data

(63) Continuation of application No. 17/721,874, filed on Apr. 15, 2022, now Pat. No. 11,838,453.

(51) Int. Cl.
*H04N 21/81* (2011.01)

(52) U.S. Cl.
CPC .................. *H04N 21/812* (2013.01)

(58) Field of Classification Search
CPC ............. H04N 21/812; H04N 21/8545; H04N 21/6377; G06F 3/011
USPC ......................................................... 725/32
See application file for complete search history.

(56) References Cited

U.S. PATENT DOCUMENTS

| 11,838,453 B2 | 12/2023 | Phillips |
| 2002/0194589 A1 | 12/2002 | Cristofalo et al. |
| 2004/0015608 A1 | 1/2004 | Ellis et al. |
| 2007/0061201 A1 | 3/2007 | Ellis et al. |
| 2007/0078706 A1 | 4/2007 | Datta et al. |
| 2008/0297669 A1 | 12/2008 | Zalewski et al. |
| 2008/0318676 A1 | 12/2008 | Ham |
| 2009/0318235 A1* | 12/2009 | Ashida ............... A63F 13/358 463/42 |
| 2010/0016080 A1 | 1/2010 | Garden et al. |
| 2014/0004934 A1 | 1/2014 | Peterson et al. |

(Continued)

OTHER PUBLICATIONS

Anonymous, "DASH Industry Forum: Catalyzing the adoption of MPEG-DASH", (Mar. 1, 2022), XP093052064, Retrieved from the Internet: URL:https://dashif.org/news/webrtc-report/ [retrieved on Jun. 6, 2023].

(Continued)

*Primary Examiner* — Cynthia M Fogg
(74) *Attorney, Agent, or Firm* — Haley Guiliano LLP

(57) ABSTRACT

Interactive video game content for a video game is streamed to a client device using a first streaming protocol configured for low-latency streaming. When an indication of non-interactive content to be inserted into the video game is detected, streaming of the interactive video game content to the client device is paused and the non-interactive content is streamed to the client device using a second streaming protocol configured for adaptive bitrate streaming. Upon receiving an indication that streaming of the non-interactive content to the client device has ended, streaming of the interactive content to the client device is resumed using the first streaming protocol.

20 Claims, 15 Drawing Sheets

(56) References Cited

U.S. PATENT DOCUMENTS

| | | | |
|---|---|---|---|
| 2014/0349763 A1* | 11/2014 | Lanzoni | A63F 13/335 |
| | | | 463/42 |
| 2015/0326441 A1* | 11/2015 | Smith | H04L 45/125 |
| | | | 370/255 |
| 2017/0054776 A1 | 2/2017 | Dao et al. | |
| 2017/0087455 A1 | 3/2017 | Black | |
| 2018/0068526 A1 | 3/2018 | Burgin et al. | |
| 2019/0180319 A1 | 6/2019 | Jaatinen et al. | |
| 2019/0208445 A1* | 7/2019 | Klatsky | H04L 65/80 |
| 2019/0378369 A1 | 12/2019 | Washington et al. | |
| 2020/0204849 A1 | 6/2020 | Loheide et al. | |
| 2022/0230379 A1 | 7/2022 | Shriram et al. | |
| 2023/0336836 A1 | 10/2023 | Phillips | |

OTHER PUBLICATIONS

Anonymous, "Marrying WebRTC and DASH for Interactive Streaming", XP093052055, Retrieved from the Internet: URL:https://datatracker.ietf.org/meeting/113/materials/slides-113-mops-dashwebrtc-report-02 [retrieved on Jun. 6, 2023].

Ng et al., "Examining the effects of avatar customization and narrative on engagement and learning in video garmes," Proceedings of CGAMES'2013 pp. 87-90 (2013).

Stockhammer T., "Dash-IF Report: DASH and WebRTC-Based Streaming: webRTC", (Mar. 1, 2022), pp. 1-38, XP093052051, Retrieved from the Internet: URL:https://dashif.org/webRTC/report.html [retrieved on Jun. 6, 2023].

* cited by examiner

SYSTEMS AND METHODS FOR EFFICIENT MANAGEMENT OF RESOURCES FOR STREAMING INTERACTIVE MULTIMEDIA CONTENT

CROSS-REFERENCE TO RELATED APPLICATION

This application is a continuation of U.S. patent application Ser. No. 17/721,874, filed Apr. 15, 2022, the disclosures of which are hereby incorporated by reference herein in their entireties.

BACKGROUND

This disclosure is directed to reducing bandwidth requirements for interactive content. In particular, techniques are disclosed for reducing bandwidth requirements by delivering non-interactive content inserted into the interactive content using adaptive bitrate streaming.

SUMMARY

Online purchasing of games with the ability to download, install, and run the game locally has been around for a long time. Video game companies are now starting to offer services for users to subscribe and play games that run in the network. This is known as cloud gaming. Cloud gaming is gaining traction with game studios, internet companies and network operators. There are currently products on the market like Google's Stadia™, Nvidia's GeForce Now™ and Sony's PS Now™ which offer remote game streaming as a business. Amazon is also entering into the business of cloud gaming.

Cloud gaming uses a technique called remote rendering. Remote rendered games run somewhere in the network, typically at a network edge location, and encode the video, audio and haptics output of the rendered game. The encoded video, audio, and haptics are transported or streamed over the network using a low latency protocol such as RTP to the client device. The client device decodes the video, audio and haptics data streams and renders those to the display the game on a client device. The controller input is consumed on the local device and delivered over the network to the remotely running game engine. In remote rendered cloud gaming, the game engine is running at the edge and rendering the video output.

Cutscenes are included by game studios and provide a video cinematic experience to enhance the game experience and to mask long load times when transitioning from one main game play level/world to the next. Game level load times can be as much as 30-50 seconds when transitioning from one level to the next. Rather than show a busy cursor like an animated icon, game engines offer the ability to render a cutscene which ties to the game play and involves computer animated in-game characters acting out scenes which tell a story for the upcoming level. These cutscenes can be up to 5-10 minutes. The game engine will allow for bypassing the cutscene once the next game level has been loaded allowing the user to continue after the required loading time.

Many newer game cutscenes are now interactive and are customized to in-game purchases and upgrades. When games are running locally and the cutscenes are generated from the same game engine, this is basically an extension of the game, and it is straight forward to offer basic interactivity and generate a custom cutscene based on the customization of the player's character. In cloud gaming, it is helpful to offer the same experience without consuming the managed network resources and the bandwidth typically required to run a game in its main gaming mode.

Additionally, many extended reality (XR) (e.g., augmented reality (AR) or virtual reality (VR)) developers have begun taking advantage of remote rendering techniques to support richer and more enhanced AR and VR applications. Game engines such as Unreal Engine, Blender, and Unity, are being leveraged by AR and VR developers to support AR and VR applications.

In managed or semi-managed networks (e.g., 5G mobile networks), a dedicated slice for cloud gaming can be set up at the edge of the network. The "edge of the network" or "network edge" often refers to a network node or nodes accessible by the client device providing the game to the end-user. These nodes may provide, to the client device, computational resources or infrastructure to execute the game or portions of the game. Load balancing may be an issue with cloud gaming and edge computing. Load bearers may be assigned with a priority or requested bandwidth for the video, audio, and haptics stream delivery. In some instances, cloud gaming systems that enable clients to take advantage of resources at the network edge enable a client device to provide a game to an end-user without having the game or other software installed on the client device. In some instances, a client device may have an app installed to access a cloud gaming library but may not need the games installed in order for the user to play the games on the client device. In any event, cloud gaming may demand a high level of edge computing and network communication. For example, delivering non-interactive cinematic cutscenes or advertisements using a low latency encoding scheme using an IP GOP structure and a minimal user equipment buffer used in active game play can result in a much higher bitrate encoding than necessary due to the ultra-low latency encoding requirement in remote rendered cloud gaming. This results in a much higher bandwidth usage over a managed network such as a 5G mobile network. Rendering and encoding cutscenes also requires more GPU resources at the network edge.

In light of problems stemming from the resource-intensive nature of cloud gaming and edge computing, particularly with respect to rendering and encoding cutscenes (e.g., in a gaming or XR context), what is needed is a technique for conserving bandwidth and computing resources that are allocated for cloud based real-time interactive content, such as gaming, AR applications, and VR applications. Such resources may be conserved by switching from network managed real-time encoding and delivery of media data to over-the-top (OTT) delivery of media data using adaptive bitrate (ABR) encoding for portions of the content that do not require ultra-low latency encoding. Examples of such content may include game cutscenes, supplemental content, and advertisements. This also significantly reduces the file size of the interactive content, as the data required to render non-interactive content is less than that of interactive content. Thus, the storage requirements at network edge locations are reduced. Additionally, this allows for faster distribution time for the interactive content to be distributed from the content provider to network edge locations.

Systems and methods are described herein for reducing bandwidth requirements for streaming content for an interactive multimedia presentation (e.g., a video game, an AR presentation, or a VR presentation). Interactive content is streamed to a client device using a first streaming protocol or technique. The first streaming protocol or technique may be an ultra low-latency protocol configured for low-latency real-time streaming of media data, such as the Real Time Transport Protocol (RTP). This type of protocol is ideal for real-time media delivery such as for interactive content, as any buffering or lagging of interactive content significantly impacts the user experience of such content. In some instances, the first streaming protocol or technique may be any suitable technique that relies on encoding content at a single bit rate. When an indication of non-interactive content, or supplemental content (e.g., an interactive cutscene for a video game), to be inserted into the interactive multimedia presentation is detected, streaming of the interactive content to the client device is paused. The non-interactive or supplemental content may be streamed to the client device using a second streaming protocol or technique, such as the Hypertext Transfer Protocol (HTTP) live streaming protocol (HLS). For example, the streaming of the interactive content may be monitored for an indication of non-interactive or supplemental content to be inserted, or for whether the streaming of the interactive content has ended or has temporarily paused. The second streaming protocol may be a protocol configured for adaptive bitrate streaming. Non-interactive or supplemental content does not require low latency, and buffering or lagging of non-interactive or supplemental content will not impact the media content (e.g., game play). Therefore, more traditional adaptive bitrate streaming can be effectively utilized to deliver the highest quality non-interactive or supplemental content to the client device while consuming the least amount of bandwidth and other system resources. In some embodiments, the second streaming protocol or technique may be any suitable technique that relies on adaptive bit rate encoding to encode content at multiple bitrates. Upon receiving an indication that streaming of the non-interactive or supplemental content to the client device has ended, streaming of the interactive content to the client device is resumed using the first streaming protocol or technique.

In some embodiments, the indication that streaming of the non-interactive or supplemental content to the client device has ended is a user input to skip a portion of the non-interactive or supplemental content item. The user input is received during the streaming of the non-interactive or supplemental content. In response to receiving the user input, streaming of the non-interactive or supplemental content to the client device is stopped and streaming of the interactive video game content to the client device is then resumed.

In some cases, the non-interactive or supplemental content may be chosen or customized for each particular user. For example, the non-interactive or supplemental content may be an advertisement and so an advertisement for an item in which the user may be interested can be selected. As another example, the non-interactive or supplemental content may be a cutscene between two portions of interactive gameplay that may change based on the type of character the user selected. In a fantasy role-playing game (RPG), the user may be able to choose their character as one of several different races (e.g., elf, dwarf, mage, etc.), and cutscenes may include content that is specific to each race. Other examples include changes to the appearance of the user's character due to in-game acquisitions, upgrades, and purchases of clothing, weaponry, armor, or other items. Thus, once a game session is established, an identifier of the user may be identified. A profile is then retrieved based on the identifier. The profile may be a game-specific profile that includes information about the user's character in the video game or may be a broader profile that includes information used for targeted advertising. Based on the profile, the non-interactive content item is chosen for streaming to the client device.

For customized and interactive supplemental content, such as cutscenes, two interactive content engines may be used. One engine at the network edge runs the main game levels. Another engine (e.g., dedicated to playing cutscenes, advertisements, or other supplemental content, any of which may be interactive) runs at another location, either at an edge of a Hyper Cloud Provider (HCP) or at another location in the operator's network. The system automatically switches between engines based on needed cutscene playout. There are two means of delivering the customized or interactive cutscene. It can be streamed over an unmanaged network, internal to the operator or from an HCP, by using a real-time transport protocol such as RTP leveraging low latency, low loss, scalable throughput (L4S) or using a live adaptive bitrate (ABR) protocol (e.g., HLS, MPEG-DASH, Microsoft Smooth Streaming, Adobe Dynamic HTTP Streaming) leveraging Common Media Application Format (CMAF) for low latency ABR delivery.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

Figure 1:
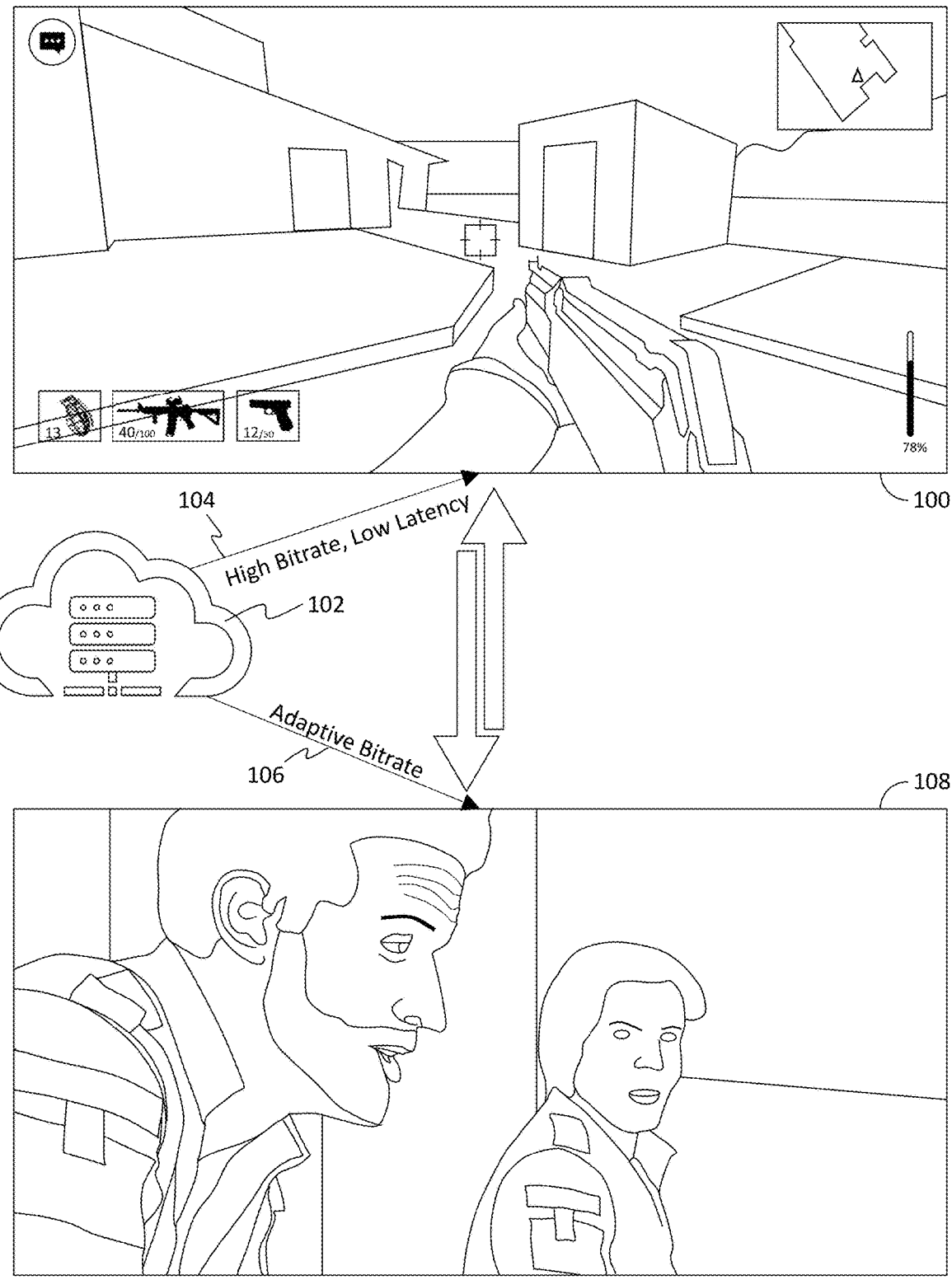
FIG. 1 shows an example of an interactive multimedia presentation with supplemental content inserted therein, in accordance with some embodiments of the disclosure.

FIG. 1 shows an example of an interactive multimedia presentation with supplemental content inserted therein, in accordance with some embodiments of the disclosure. Interactive multimedia presentations may include video games, AR content, and VR content. As AR and VR developers are increasingly leveraging existing game engines for their applications, the descriptions of various embodiments of this disclosure will be discussed in the context of video games. However, it will be apparent to anyone skilled in the art that the descriptions can be applicable to other types of interactive multimedia presentations.

Interactive multimedia content 100 may be a video game. In the example of FIG. 1, interactive multimedia content 100 is a first-person shooter video game. Cloud-based interactive content server 102 (e.g., a game engine server) encodes and transmits 104 the video game content to a client device using a high-bitrate low-latency streaming protocol. Examples of such protocols include Web Real-Time Communication protocol (WebRTC), Real Time Messaging Protocol (RTMP), Real-Time Transport Protocol (RTP), Real-Time Streaming Protocol (RTSP), low-latency HTTP Live Streaming protocol (HLS), low latency Common Media Application Format (CMAF) for MPEG-DASH, WebRTC, etc.

When supplemental content, such as an advertisement or a cutscene, is to be added into the interactive multimedia presentation, cloud-based interactive content server 102 pauses streaming of the video game content to the client device and encodes and transmits 106 the supplemental content 108 to the client device using an adaptive bitrate protocol. Examples of such protocols include MPEG-DASH, Apple HTTP Live Streaming (Apple HLS), Adobe HTTP Dynamic Streaming (HDS), or Microsoft Smooth Streaming (MSS), etc. The supplemental content may be customized for each user. For example, an advertisement inserted into the interactive multimedia presentation may be selected for each user based on each user's preferences, media consumption history, shopping history, etc. In some cases, video game cutscenes can be customized for each user as well. In many video games, in-game character selections, purchases, and upgrades can change the appearance of a user's avatar. Portions of cutscenes that include a user's avatar can thus be customized such that the appearance of the user's avatar accurately reflects these changes.

Figure 2:
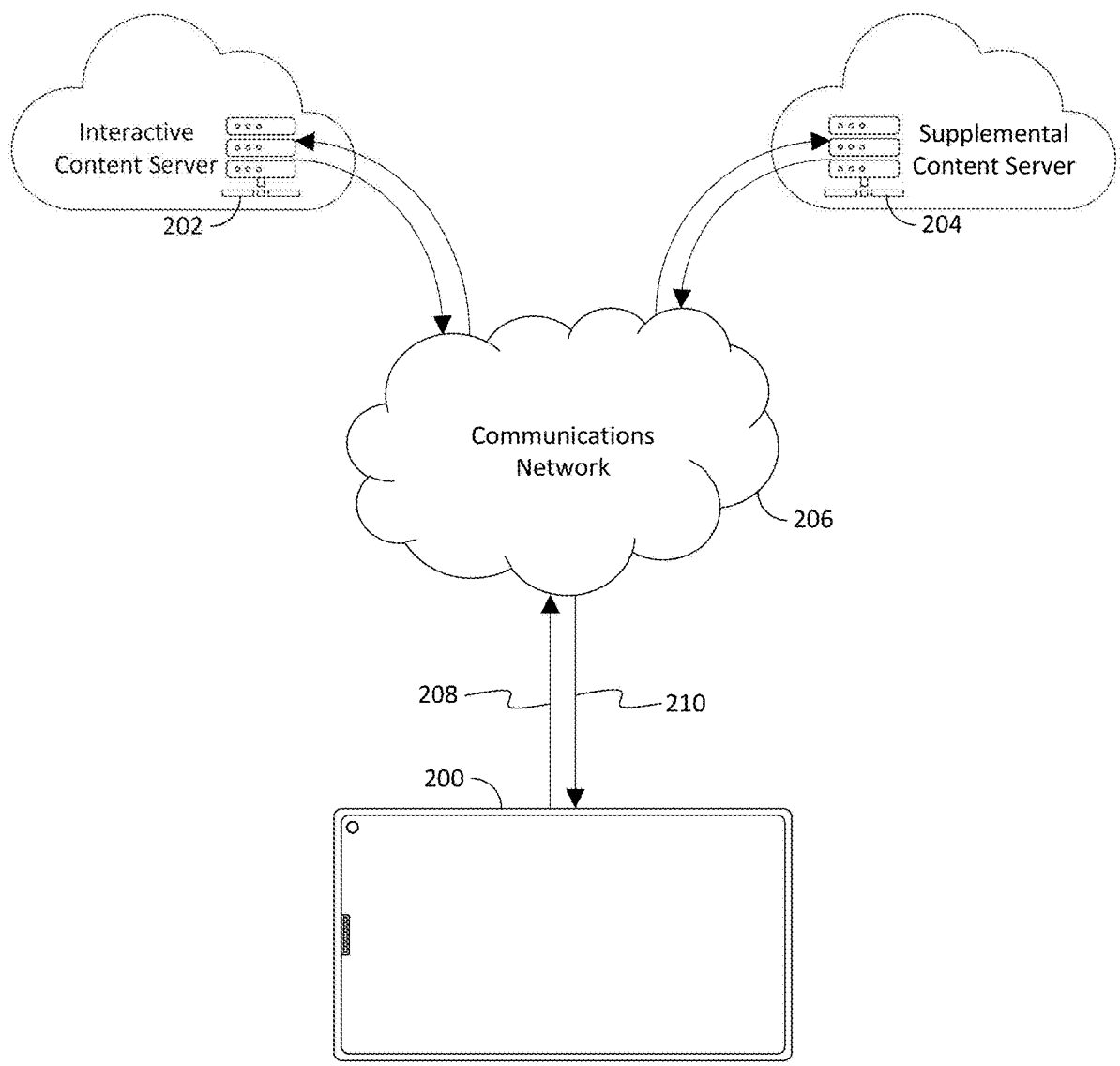
FIG. 2 is an example of a system for providing an interactive multimedia presentation in which interactive content and supplemental content are provided from different sources, in accordance with some embodiments of the disclosure.

For supplemental content that is not customized, pre-rendered media may already be encoded in a format compatible with the second streaming protocol. FIG. 2 is an example of a system for providing an interactive multimedia presentation in which interactive content and supplemental content are provided from different sources, in accordance with some embodiments of the disclosure. Client device 200 receives streaming interactive content from interactive content server 202 and receives supplemental content from supplemental content server 204. Client device 200 communicates with interactive content server 202 and supplemental content server 204 through communications network 206. When a point in the interactive multimedia presentation at which supplemental content is to be inserted is reached, client device 200 may transmit 208 an indication of, or request for, supplemental content insertion to interactive content server 202. Interactive content server 202 may in turn request supplemental content from supplemental content server 204 or may instruct supplemental content server 204 to provide supplemental content to client device 200. Whether from interactive content server 202 or supplemental content server 204, client device 200 receives 210 the supplemental content.

In some embodiments, interactive content server 202 may be operated by a first content provider while supplemental content server 204 may be operated by a second content provider. In some embodiments, interactive content server 202 and supplemental content server 204 may be operated by the same content provider but are physically separate servers and may be in geographically separate locations. In yet other embodiments, interactive content server 202 and supplemental content server 204 may be virtual server applications running on the same physical server or on two different physical servers.

Figure 3:
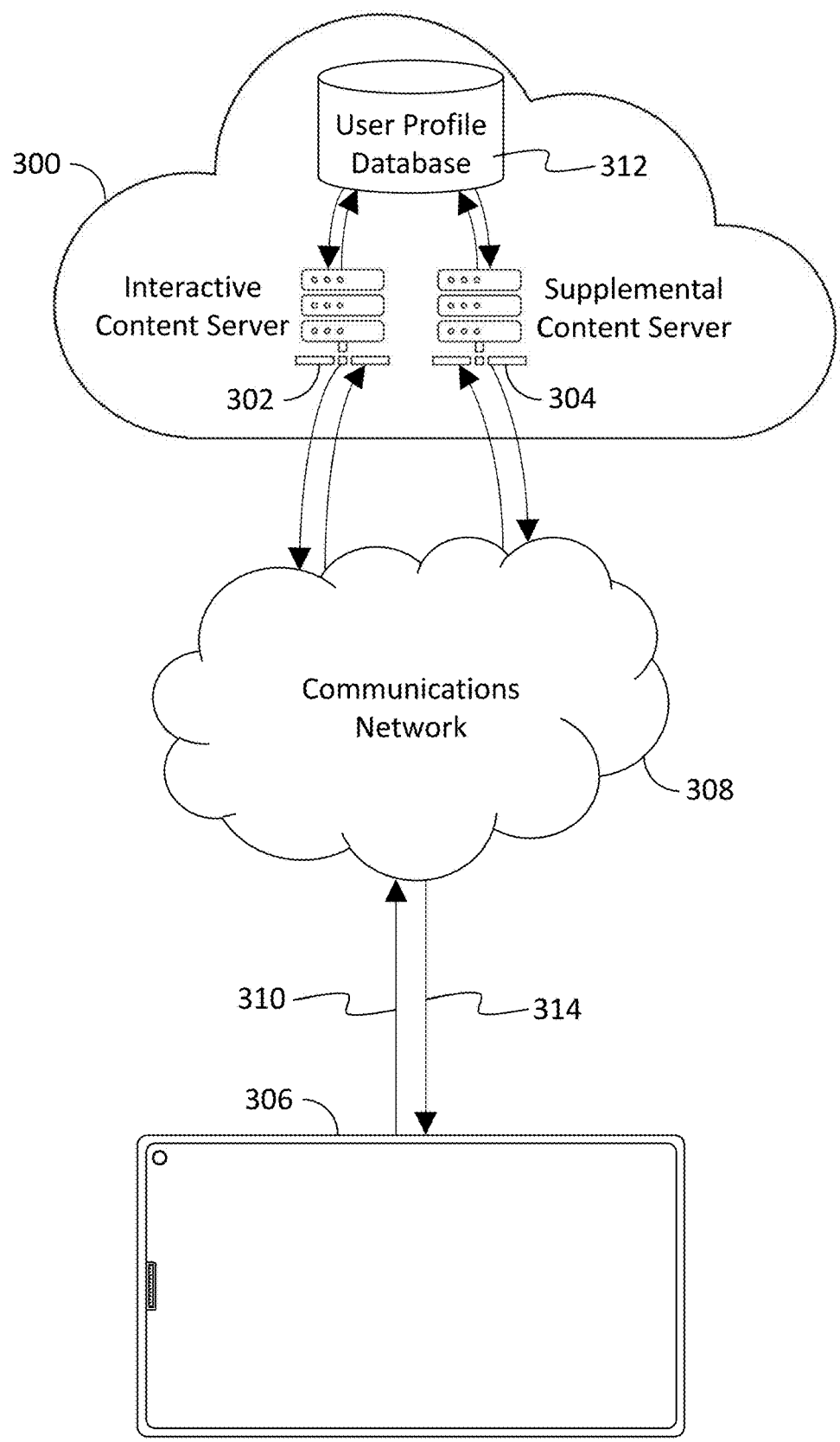
FIG. 3 is an example of a system for providing an interactive multimedia presentation in which interactive content and supplemental content are provided from the same source, in accordance with some embodiments of the disclosure.

Customized supplemental content, however, must be generated, rendered, and encoded before it can be streamed to the user. This may require significant system resources. The interactive content server 202 may temporarily reduce the allocation of system resources to other game sessions in order to generate, render, and encode the supplemental content. In some implementations, however, the task of generating, rendering, and encoding the customized supplemental content may be given to another interactive content engine within the content provider's network. FIG. 3 is an example of a system for providing an interactive multimedia presentation in which interactive content and supplemental content are provided from the same source, in accordance with some embodiments of the disclosure. Content provider network 300 includes interactive content server 302 and supplemental content server 304. Supplemental content server 304 may have similar processing capabilities and system resources as interactive content server 302 to enable supplemental content server 304 to generate, render, and encode customized supplemental content. Interactive content server 302 and supplemental content server 304 communicate with client device 306 via communications network 308. Client device 306 may, upon detecting that supplemental content is to be inserted into the interactive multimedia presentation, transmit 310 a request for supplemental content to interactive content server 302 or to supplemental content server 304.

Interactive content server 302 or supplemental content server 304 may access a user profile database 312 to retrieve customization parameters relevant to the supplemental content. For example, if the supplemental content is an advertisement, product purchase histories, Internet search histories, or other information useful in selecting an advertisement for a particular user may be retrieved. If the supplemental content is a game cutscene or other cinematic content, information related to the appearance of the user's in-game avatar such as clothing, skin color, size (e.g., height and weight), fictional race (e.g., elf, dwarf, extraterrestrial being, etc.) and the like may be retrieved. Supplemental content server 304 generates, renders, and encodes the supplemental content for the user using the retrieved information. The supplemental content is then streamed 314 to client device 306.

Figure 4:
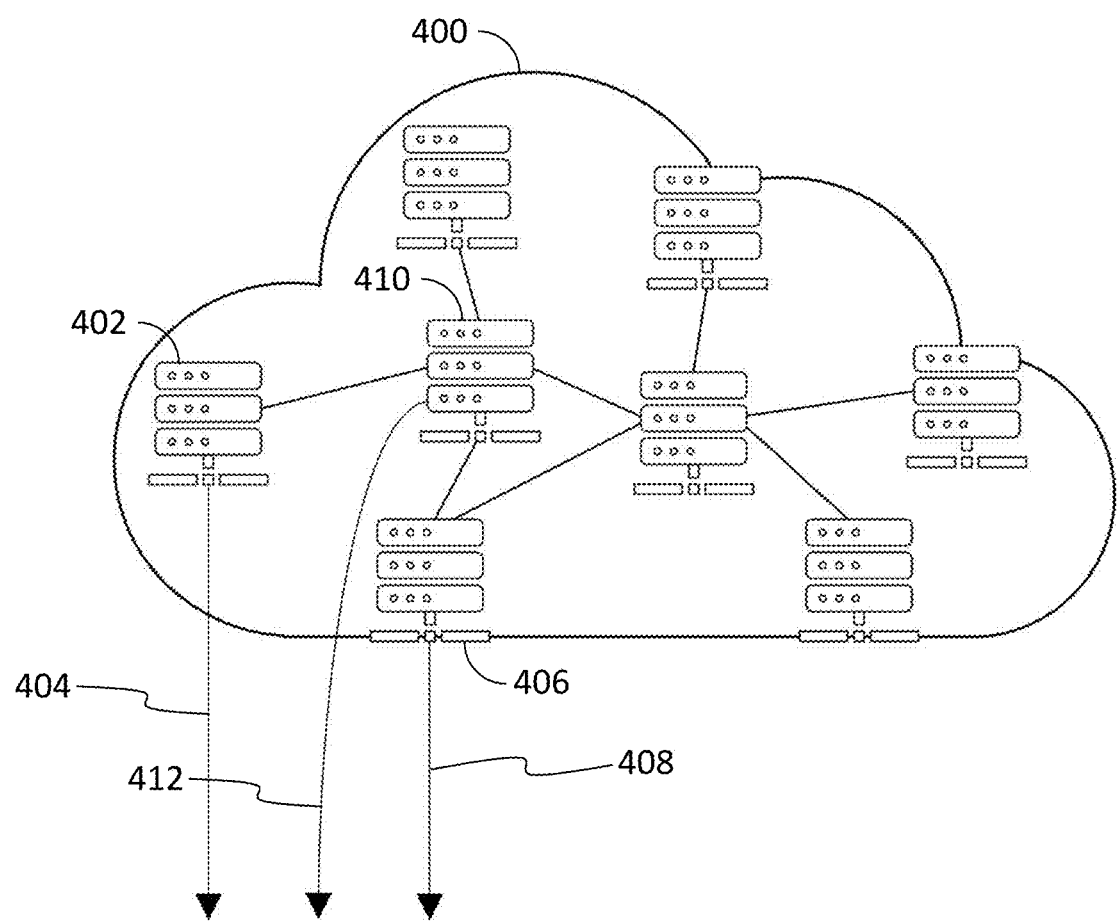
FIG. 4 is an example of a content delivery network for providing an interactive multimedia presentation, in accordance with some embodiments of the disclosure.

FIG. 4 is an example of a content delivery network for providing an interactive multimedia presentation, in accordance with some embodiments of the disclosure. Content delivery network 400 may include a plurality of servers. Some servers are generally utilized for content origination and do not usually handle streaming of content to client devices. Other servers which are usually tasked with streaming content to client devices, known as edge servers, are located in geographically separate locations to better server users in different areas. A given edge server handles streaming of content to client devices that are located closer to that edge server than to any other edge server.

Edge server 402 may be a game engine server and is responsible for streaming 404 real-time interactive content to one or more client devices. Edge server 402 may maintain several interactive content sessions simultaneously, each for a different user. Edge server 406 may be a second game engine server and may also be responsible for streaming 408 real-time interactive content to one or more other client devices. Edge server 406, may, alternatively or additionally, be responsible for streaming supplemental content to one or more users. In some implementations, a server other than an edge server, such as server 410, may be responsible for streaming 412 supplemental content to client devices. This allows edge servers 402 and 406 to commit their full resources to real-time processing and streaming of interactive content, thus providing users with the best quality of experience, while other servers are tasked with the potentially processor-intensive tasks of generating, rendering, and encoding supplemental content for each user.

Figure 5:
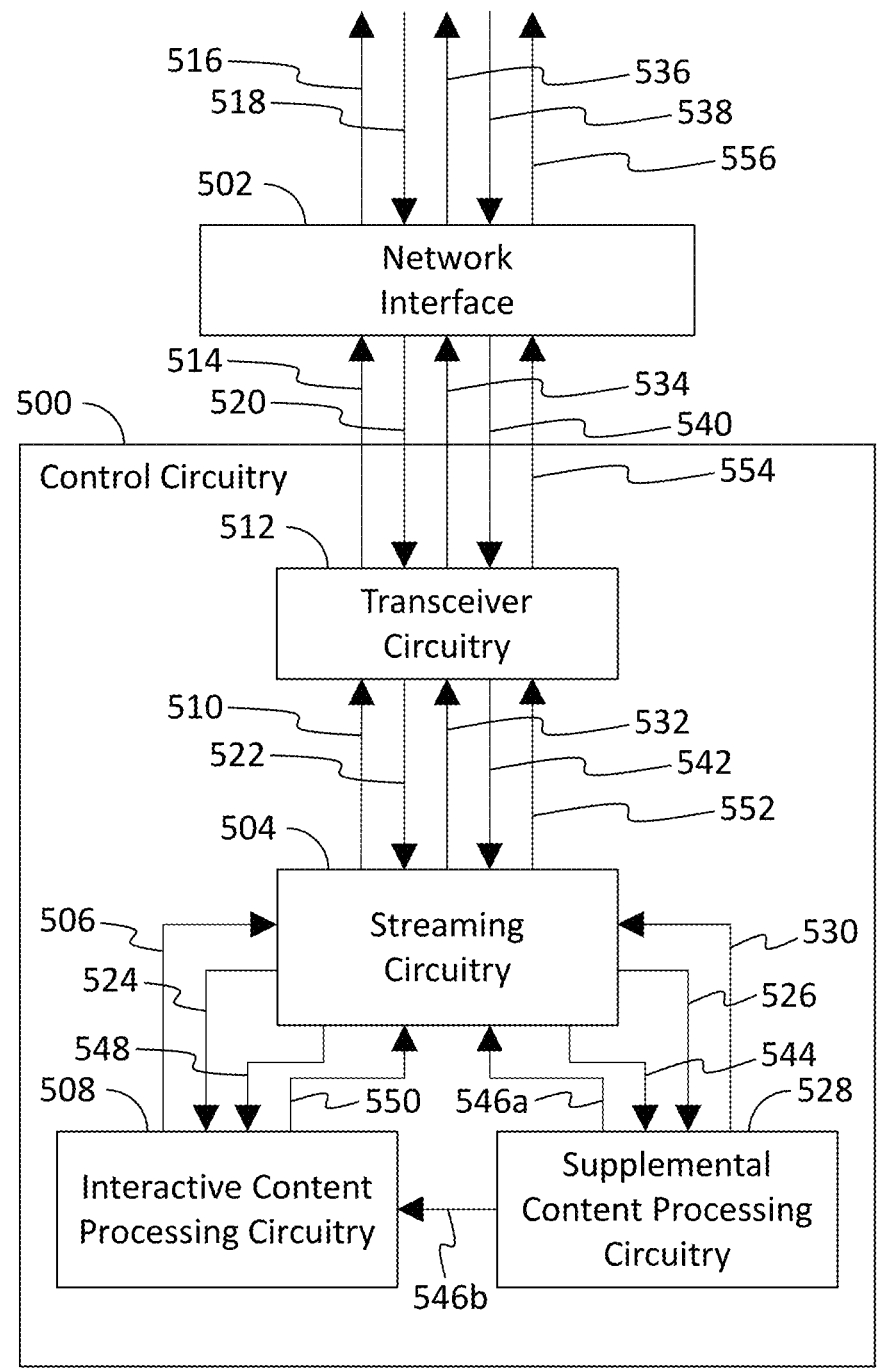
FIG. 5 is a block diagram showing components and data flow therebetween of a system for providing an interactive multimedia presentation in which interactive content and supplemental content are provided from the same source, in accordance with some embodiments of the disclosure.

FIG. 5 is a block diagram showing components and data flow therebetween of a system for providing an interactive multimedia presentation in which interactive content and supplemental content are provided from the same source, in accordance with some embodiments of the disclosure. More specifically, the components shown in FIG. 5 relate to implementations in which real-time interactive content and supplemental content are provided from the same content provider and in which a single device or application controls content delivery to client devices from an interactive content server or server application and a supplemental content server or server application. For simplicity, control circuitry 500 will be discussed as though it resides on a single server. However, those skilled in the art will appreciate that the functions described in connection with FIG. 5 as being performed by control circuitry 500 or any of its components may be distributed among one or more physical or virtual servers.

Control circuitry 500 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Control circuitry 500 communicates with other devices (e.g. client devices and other servers) via network interface 502. Network interface 502 may be any suitable communications interface for transmitting data from a server, or network of servers, to other devices across a communications network. In some embodiments, the communications network over which the interactive content and supplemental content are streamed to the client device is a mobile broadband network, such as a 5G network. In such embodiments, network interface 502 may be a mobile broadband transmitter or an interface with one or more distribution nodes of a mobile broadband network.

Control circuitry 500 includes streaming circuitry 504. Streaming circuitry 504 includes any suitable processing circuitry for generating a media stream for interactive media content or supplemental content. For example, streaming circuitry 504 may be a graphical processing unit (GPU) such as an NVIDIA GeForce RTX, or other GPU solutions. Streaming circuitry 504 receives 506 interactive media content from interactive content processing circuitry 508. Interactive content processing circuitry 508 may be, for example, a game engine configured to process game environment and level data along with user inputs to generate, render, and encode interactive content into a real-time media format. Streaming circuitry 504 then generates a real-time stream for the interactive content and transmits 510 the real-time stream to transceiver circuitry 512. Transceiver circuitry 512 comprises a network connection over which data can be transmitted to and received from remote devices, such as an ethernet connection, WiFi connection, USB connection, or connection employing any other suitable data transfer protocol or networking protocol. Transceiver circuitry 512 in turn transmits 514 the real-time stream to network interface 502, where the stream is finally transmitted 516 over a communications network to a client device.

Control circuitry 500 monitors the streaming of the interactive content for an indication that supplemental content is to be inserted into the interactive multimedia presentation. For example, control circuitry 500 may monitor the interactive media content being received from interactive content processing circuitry 508, or metadata thereof, for an indication that a supplemental content insertion point is approaching or has arrived. Alternatively or additionally, control circuitry 500 may monitor data received from a client device which may comprise a request for supplemental content. A client device may independently determine that a supplemental content insertion point is approaching and request a supplemental content item. In the case of a video game cutscene, the request may include an identifier of a specific cutscene. The request is received 518 from the client device at network interface 502, which routes 520 the request to control circuitry 500, where it is received using transceiver circuitry 512. Transceiver circuitry 512 in turn transmits 522 the request to streaming circuitry 504. Based on receiving the request, streaming circuitry 504 determines that supplemental content is to be inserted into the interactive multimedia presentation.

In response to determining that supplemental content is to be inserted into the interactive multimedia presentation, streaming circuitry 504 instructs 524 interactive content processing circuitry 508 to pause output of the interactive content. In some embodiments, interactive content processing circuitry 508 is responsible for processing of interactive content for multiple interactive multimedia sessions, each being associated with a different user or different client device. In such cases, streaming circuitry 504 may provide a session identifier in the instruction to pause output of the interactive content, thereby causing interactive content processing circuitry 508 to pause processing of only the session into which the supplemental content is to be inserted.

Streaming circuitry 504 then instructs 526 supplemental content processing circuitry 528 to begin processing and output of the supplemental content to be inserted into the interactive multimedia presentation. Supplemental content processing circuitry 528 may be a less powerful graphical processing unit than interactive content processing circuitry 508 and may be configured for insertion of non-interactive supplemental content such as advertisements. However, supplemental content processing circuitry 528 may be similar to interactive content processing circuitry 508 for generating, rendering, and encoding customized supplemental content. In other embodiments, supplemental content processing circuitry 528 is merely responsible for identifying supplemental content items and providing an associated manifest file or URL from which the client device can stream the supplemental content. Supplemental content processing circuitry 528 may request, from a supplemental content database, a manifest file or URL associated with a specific supplemental content item to be inserted into the interactive multimedia presentation.

In embodiments in which supplemental content processing circuitry 528 is responsible for encoding and output of supplemental content directly, supplemental content processing circuitry 528 may encode the supplemental content in a format compatible with a streaming protocol configured for adaptive bitrate streaming. Supplemental content processing circuitry 528 may also receive, request, or otherwise access information regarding available bandwidth at the client device and encode the supplemental content in a format most suited to the available bandwidth. For example, while the communications network may be a 5G mobile broadband network, the client device may be in a location that does not have good 5G coverage and can only support 4G transmissions. Supplemental content processing circuitry 528 may therefore encode the supplemental content in a format such that the highest bitrate available to the client device does not exceed the available bandwidth. This may conserve system resources when encoding the supplemental content.

Whether it is a manifest file, a URL, or encoded media content, supplemental content processing circuitry 528 transmits 530 its output to streaming circuitry 504. Streaming circuitry 504 then generates an adaptive bitrate (ABR) stream for the supplemental content and transmits 532 the ABR stream to transceiver circuitry 512, which then transmits 534 the output to network interface 502 where it is transmitted 536 to the client device over the communications network.

During playback of the supplemental content, a user of the client device may select an option to skip a portion of the supplemental content. An indication of such a selection, or of a natural end of playback of the supplemental content, may be received 538 from the client device via network interface 502. Network interface 502 may route 540 the indication to control circuitry 500, where it is received using transceiver circuitry 512. Transceiver circuitry 512 transmits 542 the indication to streaming circuitry 504. In response to receiving the indication, streaming circuitry 504 instructs 544 supplemental content processing circuitry 528 to end processing and output of the supplemental content. Supplemental content processing circuitry 528 transmits 546*a* an acknowledgment and/or an indication that output of the supplemental content has stopped to streaming circuitry 504. Streaming circuitry 504 then instructs 548 interactive content processing circuitry 508 to resume generating, rendering, and encoding the interactive content for output to the client device. Alternatively or additionally, supplemental content processing circuitry 528 transmits 546*b* such indications directly to interactive content processing circuitry 508, in response to which interactive content processing circuitry 508 resumes generating, rendering, and encoding the interactive content for output to the client device. Interactive content processing circuitry 508 transmits 550 the interactive content to streaming circuitry 504. Streaming circuitry 504 then generates a real-time stream for the interactive content and transmits 552 the real-time stream to transceiver circuitry 512. Transceiver circuitry 512 in turn transmits 554 the real-time stream to network interface 502, where it is then transmitted 556 to the client device over the communications network.

Figure 6:
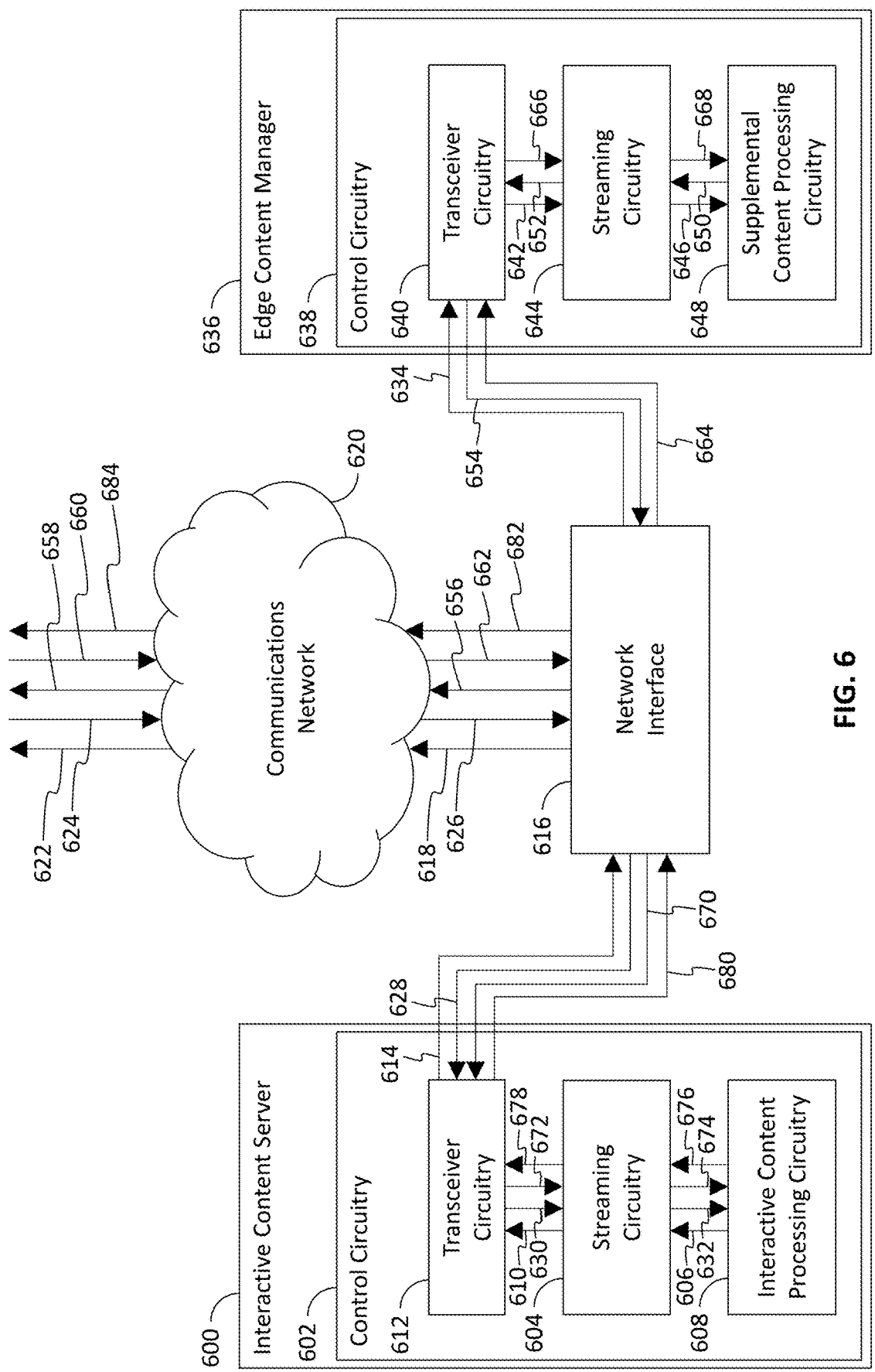
FIG. 6 is a block diagram showing components and data flow therebetween for a system for providing an interactive multimedia presentation in which interactive content and supplemental content are provided from different sources, in accordance with some embodiments of the disclosure.

FIG. 6 is a block diagram showing components and data flow therebetween for a system for providing an interactive multimedia presentation in which interactive content and supplemental content are provided from different sources, in accordance with some embodiments of the disclosure. For example, the interactive content may be provided by an interactive content server while the supplemental content is provided by an edge content manager that resides on a different server. Interactive content server 600 is responsible for initializing and maintaining interactive multimedia sessions (e.g. game sessions), and generating, rendering, and encoding interactive content. Interactive content server 600 includes control circuitry 602. Like control circuitry 500, control circuitry 602 may be based on any suitable processing circuitry and comprises control circuits and memory circuits, which may be disposed on a single integrated circuit or may be discrete components. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Control circuitry 602 includes streaming circuitry 604. Like streaming circuitry 504, streaming circuitry 604 includes any suitable processing circuitry for generating a media stream for interactive media content or supplemental content. For example, streaming circuitry 604 may be a graphical processing unit (GPU) such as an NVIDIA GeForce RTX, or other GPU solutions. Streaming circuitry 604 receives 606 interactive media content from interactive content processing circuitry 608. Similar to interactive content processing circuitry 508, interactive content processing circuitry 608 may be, for example, a game engine configured to process game environment and level data along with user inputs to generate, render, and encode interactive content into a real-time media format. Streaming circuitry 604 then generates a real-time stream for the interactive content and transmits 610 the real-time stream to transceiver circuitry 612. Like transceiver circuitry 512, transceiver circuitry 612 comprises a network connection over which data can be transmitted to and received from remote devices, such as an ethernet connection, WiFi connection, USB connection, or connection employing any other suitable data transfer protocol or networking protocol. Transceiver circuitry 612 in turn transmits 614 the real-time stream to network interface 616, where the stream is transmitted 618 over communications network 620 and delivered 622 to a client device. Network interface 616, like network interface 502, may be any suitable communications interface for transmitting data from a server, or network of servers, to other devices across a communications network. In some embodiments, the communications network over which the interactive content and supplemental content are streamed to the client device is a mobile broadband network, such as a 5G network. In such embodiments, network interface 616 may be a mobile broadband transmitter or an interface with one or more distribution nodes of a mobile broadband network.

Control circuitry 602 monitors the streaming of the interactive content for an indication that supplemental content is to be inserted into the interactive multimedia presentation. For example, control circuitry 602 may monitor the interactive media content being received from interactive content processing circuitry 608, or metadata thereof, for an indication that a supplemental content insertion point is approaching or has arrived. Alternatively or additionally, control circuitry 602 may monitor data received over communications network 620 from a client device which may comprise a request for supplemental content. A client device may independently determine that a supplemental content insertion point is approaching and request a supplemental content item. In the case of a video game cutscene, the request may include an identifier of a specific cutscene. The request is transmitted 624 from the client device, over communications network 620, and received 626 from the client device at network interface 616, which routes 628 the request to interactive content server 600. Control circuitry 602 then receives the request using transceiver circuitry 612. Transceiver circuitry 612 in turn transmits 630 the request to streaming circuitry 604. Based on receiving the request, streaming circuitry 604 determines that supplemental content is to be inserted into the interactive multimedia presentation.

In response to determining that supplemental content is to be inserted into the interactive multimedia presentation, streaming circuitry 604 instructs 632 interactive content processing circuitry 608 to pause output of the interactive content. In some embodiments, interactive content processing circuitry 608 is responsible for processing of interactive content for multiple interactive multimedia sessions, each being associated with a different user or different client device. In such cases, streaming circuitry 604 may provide a session identifier in the instruction to pause output of the interactive content, thereby causing interactive content processing circuitry 608 to pause processing of only the session into which the supplemental content is to be inserted.

Network interface 616 also routes 634 the request to edge content manager 636. Edge content manager 636 is another server, separate from interactive content server 600, that is responsible for providing supplemental content to client devices. Edge content manager 636 includes control circuitry 638. Like control circuitry 500 and control circuitry 602, control circuitry 638 may be based on any suitable processing circuitry and comprises control circuits and memory circuits, which may be disposed on a single integrated circuit or may be discrete components. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Control circuitry 638 receives the request using transceiver circuitry 640. Similar to transceiver circuitry 512 and transceiver circuitry 612, transceiver circuitry 640 comprises a network connection over which data can be transmitted to and received from remote devices, such as an ethernet connection, WiFi connection, USB connection, or connection employing any other suitable data transfer protocol or networking protocol. Transceiver circuitry 640 transmits 642 the request to streaming circuitry 644. Like streaming circuitry 504 and streaming circuitry 604, streaming circuitry 644 includes any suitable processing circuitry for generating a media stream for interactive media content or supplemental content. For example, streaming circuitry 644 may be a graphical processing unit (GPU) such as an NVIDIA GeForce RTX, or other GPU solutions. Streaming circuitry 644 transmits 646 the request to supplemental content processing circuitry 648. Supplemental content processing circuitry 648, like supplemental content processing circuitry 528, may be a less powerful graphical processing unit than interactive content processing circuitry 608 and may be configured for insertion of non-interactive supplemental content such as advertisements. However, supplemental content processing circuitry 648 may be similar to interactive content processing circuitry 608 for generating, rendering, and encoding customized supplemental content. In other embodiments, supplemental content processing circuitry 648 is merely responsible for identifying supplemental content items and providing an associated manifest file or URL from which the client device can stream the supplemental content. Supplemental content processing circuitry 648 may request, from a supplemental content database, a manifest file or URL associated with a specific supplemental content item to be inserted into the interactive multimedia presentation.

In embodiments in which supplemental content processing circuitry 648 is responsible for encoding and output of supplemental content directly, supplemental content processing circuitry 648 may encode the supplemental content in a format compatible with a streaming protocol configured for adaptive bitrate streaming. Supplemental content processing circuitry 648 may also receive, request, or otherwise access information regarding available bandwidth at the client device and encode the supplemental content in a format most suited to the available bandwidth. For example, while the communications network may be a 5G mobile broadband network, the client device may be in a location that does not have good 5G coverage and can only support 4G transmissions. Supplemental content processing circuitry 648 may therefore encode the supplemental content in a format such that the highest bitrate available to the client device does not exceed the available bandwidth. This may conserve system resources when encoding the supplemental content.

Whether it is a manifest file, a URL, or encoded media content, supplemental content processing circuitry 648 transmits 650 its output to streaming circuitry 644. Streaming circuitry 644 then generates an ABR stream for the supplemental content and transmits 652 the ABR stream to transceiver circuitry 640, which then transmits 654 the output to network interface 616 where it is transmitted 656 over communications network 620 and routed 658 to the client device.

During playback of the supplemental content, a user of the client device may select an option to skip a portion of the supplemental content. An indication of such a selection, or of a natural end of playback of the supplemental content, may be transmitted 660 by the client device over the communications network 620. The indication of the selection is received 662 at network interface 616. Network interface 616 may route 664 the indication to control circuitry 638 of edge content manager 636, where it is received using transceiver circuitry 640. Transceiver circuitry 640 transmits 666 the indication to streaming circuitry 644. In response to receiving the indication, streaming circuitry 644 instructs 668 supplemental content processing circuitry 648 to end processing and output of the supplemental content. Network interface 616 also routes 670 the indication to control circuitry 602 of interactive content server 600. Control circuitry 602 receives the indication using transceiver circuitry 612. Transceiver circuitry 612 transmits 672 the indication to streaming circuitry 604. Streaming circuitry 604 then instructs 674 interactive content processing circuitry 608 to resume generating, rendering, and encoding the interactive content for output to the client device. Interactive content processing circuitry 608 transmits 676 the interactive content to streaming circuitry 604. Streaming circuitry 604 then generates a real-time stream for the interactive content and transmits 678 the real-time stream to transceiver circuitry 612. Transceiver circuitry 612 in turn transmits 680 the real-time stream to network interface 616, where it is then transmitted 682 over communications network 620 and routed 684 to the client device.

Figure 7:
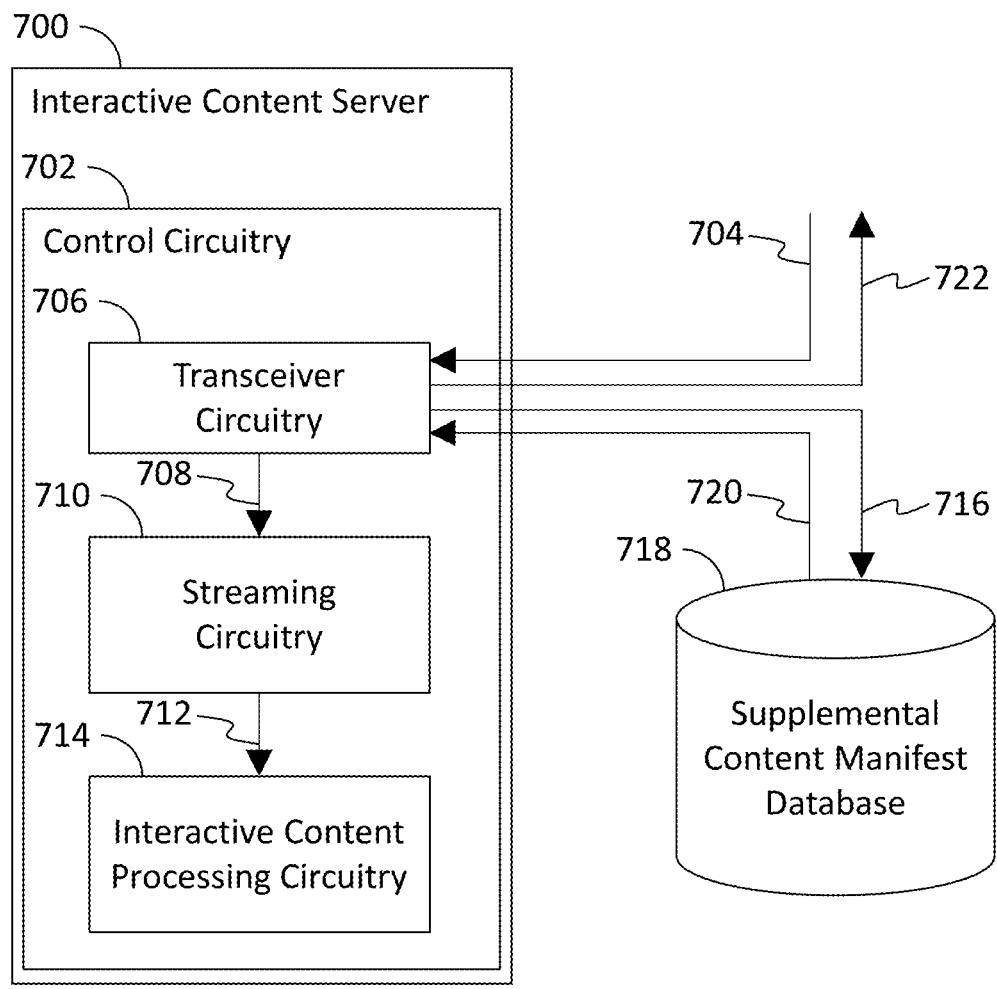
FIG. 7 is a block diagram showing components and data flow therebetween of an interactive content server when supplemental content is to be inserted into an interactive multimedia presentation, in accordance with some embodiments of the disclosure.

FIG. 7 is a block diagram showing components and data flow therebetween of an interactive content server when supplemental content is to be inserted into an interactive multimedia presentation, in accordance with some embodiments of the disclosure. Specifically, FIG. 7 depicts an interactive content server 700 that provides a manifest file for supplemental content to a client device. Interactive content server 700 includes control circuitry 702, which may be similar to control circuitry 500 or control circuitry 638 and may be based on any suitable processing circuitry as described above in connection therewith. Interactive content server 700 receives 704, using transceiver circuitry 706, an indication that supplemental content is to be inserted into the interactive multimedia presentation. Transceiver circuitry 706 may be similar to transceiver circuitry 512 or transceiver circuitry 612, described above in connection with FIGS. 5 and 6, respectively. Transceiver circuitry 706 transmits 708 the indication to streaming circuitry 710, which may be similar to streaming circuitry 504 or streaming circuitry 604, described above in connection with FIGS. 5 and 6, respectively. Streaming circuitry 710 instructs 712 interactive content processing circuitry 714, similar to interactive content processing circuitry 508 or interactive content processing circuitry 608, described above in connection with FIGS. 5 and 6, respectively, to pause generation, rendering, and encoding of the interactive content to allow for insertion of the supplemental content.

Control circuitry 702 may identify a specific supplemental content item, either based on information received from the client device, user profile data associated with the user of the client device, or from the interactive content. Transceiver circuitry 706 transmits 716 a request for the identified supplemental content item to supplemental content manifest database 718. While shown in FIG. 7 as a separate component, supplemental content manifest database 718 may, in some embodiments, reside in a memory of interactive content server 700. In other embodiments, supplemental content manifest database 718 may reside on a separate server. In response to the request, control circuitry 702 receives 720 from supplemental content manifest database 718 a manifest file for the supplemental content or, in some embodiments, a URL from which the client device can retrieve the manifest file directly. Transceiver circuitry 706 then transmits 722 the manifest file or URL to the client device.

Figure 8:
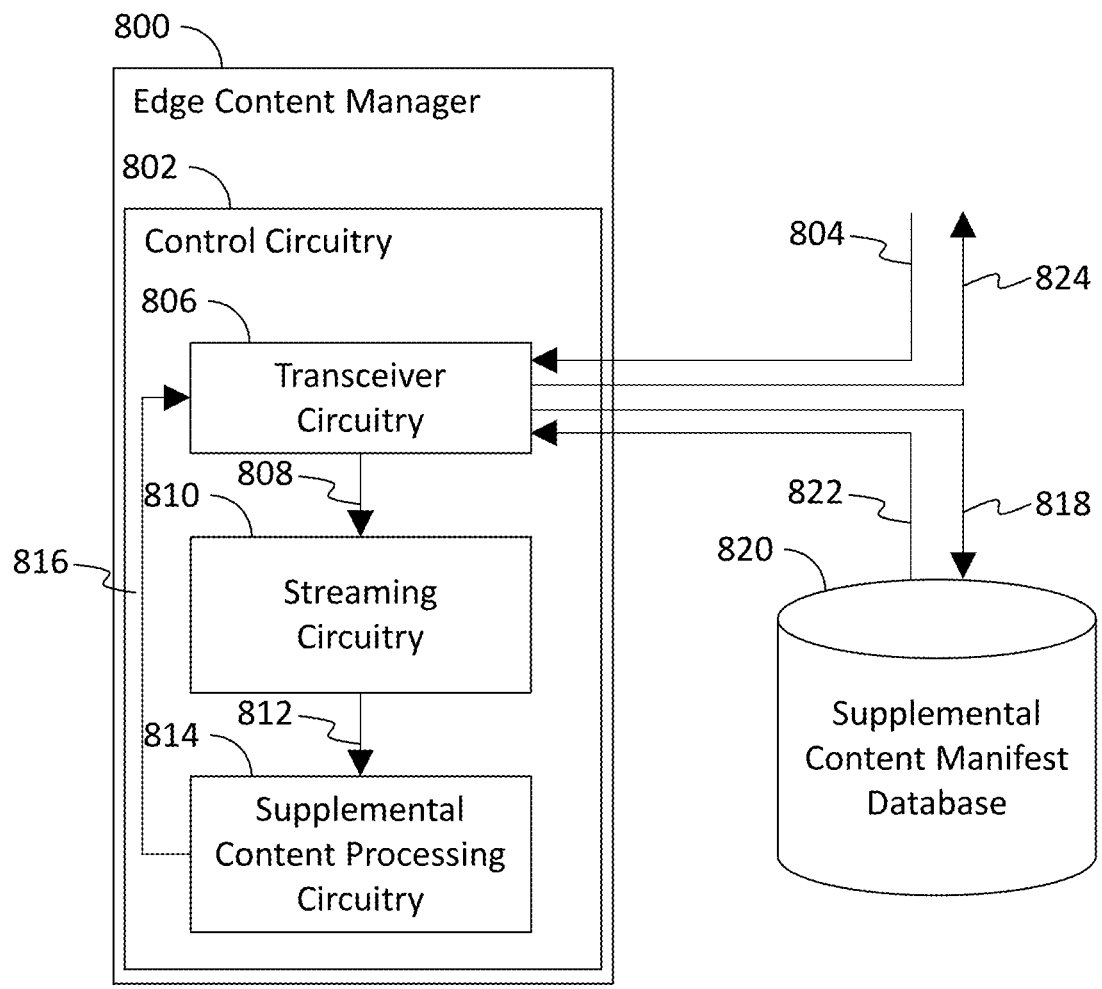
FIG. 8 is a block diagram showing components and data flow therebetween of an edge content management server for providing supplemental content, in accordance with some embodiments of the disclosure.

FIG. 8 is a block diagram showing components and data flow therebetween of an edge content management server for providing supplemental content, in accordance with some embodiments of the disclosure. Specifically, FIG. 8 depicts an edge content manager 800 that provides a manifest file for supplemental content to a client device. Edge content manager 800 includes control circuitry 802, which may be similar to control circuitry 500 or control circuitry 602 and may be based on any suitable processing circuitry as described above in connection therewith. Edge content manager 800 receives 804, using transceiver circuitry 806, an indication that supplemental content is to be inserted into the interactive multimedia presentation. In some embodiments, edge content manager 800 receives an instruction from an interactive content server to prepare supplemental content for insertion into an interactive multimedia presentation. The instruction may include a session identifier associated with the interactive multimedia presentation, a user identifier of a user associated with the client device, or a supplemental content identifier. Transceiver circuitry 806 may be similar to transceiver circuitry 512 or transceiver circuitry 640, described above in connection with FIGS. 5 and 6, respectively. Transceiver circuitry 806 transmits 808 the indication to streaming circuitry 810, which may be similar to streaming circuitry 504 or streaming circuitry 644, described above in connection with FIGS. 5 and 6, respectively. Streaming circuitry 810 instructs 812 supplemental content processing circuitry 814, similar to supplemental content processing circuitry 528 or supplemental content processing circuitry 648, described above in connection with FIGS. 5 and 6, respectively, to prepare supplemental content for insertion into the interactive multimedia presentation.

Supplemental content processing circuitry 814 may identify a specific supplemental content item, either based on information received from the client device, user profile data associated with the user of the client device, or from the interactive content. Supplemental content processing circuitry 814 transmits 816 an identifier of the specific supplemental content item to transceiver circuitry 806, which in turn transmits 818 a request for the identified supplemental content item to supplemental content manifest database 820. As in FIG. 7, above, supplemental content manifest database 820 may, in some embodiments, reside in a memory of edge content manager 800. In other embodiments, supplemental content manifest database 820 may reside on a separate server. In response to the request, control circuitry 802 receives 822 from supplemental content manifest database 820 a manifest file for the supplemental content or, in some embodiments, a URL from which the client device can retrieve the manifest file directly Transceiver circuitry 806 then transmits 824 the manifest file or URL to the client device.

Figure 9:
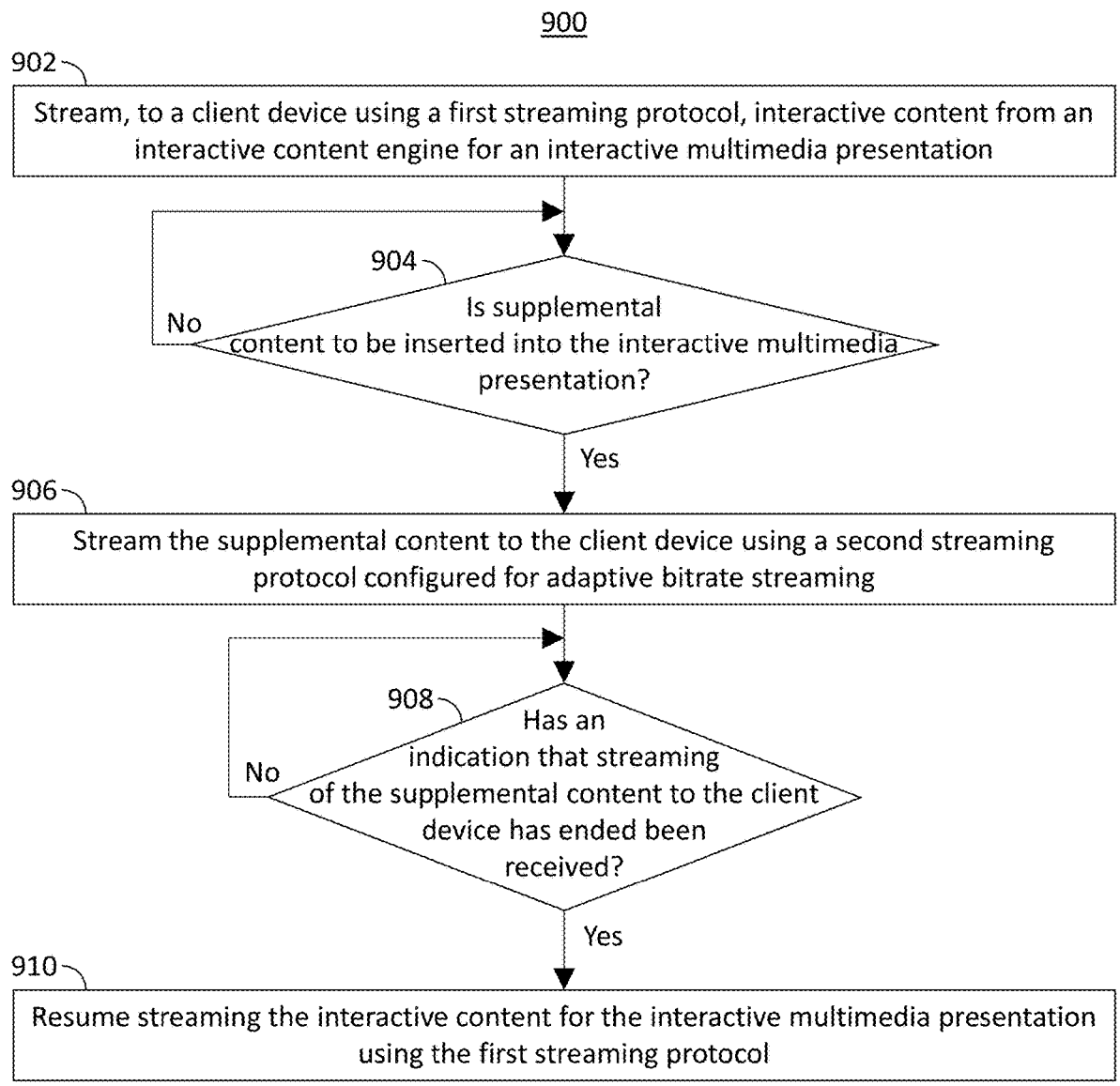
FIG. 9 is a flowchart representing a process for providing an interactive multimedia presentation, in accordance with some embodiments of the disclosure.

FIG. 9 is a flowchart representing a process 900 for providing an interactive multimedia presentation, in accordance with some embodiments of the disclosure. Process 900 may be implemented on control circuitry 500, 602, 638, 702, 802, or any combination thereof. In addition, one or more actions of process 900 may be incorporated into or combined with one or more actions of any other process or embodiment described herein.

At 902, control circuitry (e.g., control circuitry 500) streams, to a client device using a first streaming protocol, interactive content from an interactive content engine for an interactive multimedia presentation. The interactive content may be virtual reality content, augmented reality content, video game content, or any other real-time content. The interactive content engine may be a game engine, which may be used to provide video game content or may be leveraged to provide other real-time content such as virtual reality or augmented reality content. In some implementations, where the methods described herein are performed on a mobile broadband network, the interactive content engine may be a 5G Extended Reality (5G-XR) application as defined in the 3GPP technical report TR 26.928, entitled "Extended Reality (XR) in 5G." The first streaming protocol is configured for high-bitrate low-latency streaming of real-time data. While such streams are not tolerant of dropped or corrupted packets, they allow for significantly reduced lag time, which is of high importance in interactive content such as video games and virtual reality simulations.

At 904, the control circuitry determines whether supplemental content is to be inserted in the interactive multimedia presentation. For example, a client device may send a request for supplemental content upon reaching a point in the interactive multimedia presentation at which supplemental content is to be inserted. Where the interactive multimedia presentation is a video game, the client device may determine, based on the user's progress in the video game, that a cutscene is to be inserted. In some embodiments, the real-time content stream comprising the interactive content, e.g., the video game content, may contain metadata indicating that a supplemental content insertion point has been reached, or is approaching. If no indication of supplemental content insertion has been detected ("No" at 904), then streaming of the interactive content continues.

If supplemental content is to be inserted into the interactive multimedia presentation ("Yes" at 904), then, at 906, the control circuitry streams the supplemental content to the client device using a second streaming protocol configured for adaptive bitrate streaming. For example, the control circuitry may determine an available amount of bandwidth at the client device and retrieve a precached version of the supplemental content having the highest quality, or bitrate, that can be supported by the available bandwidth. The control circuitry then generates an adaptive bitrate stream from the precached version of the content and transmits the stream to the client device. In some embodiments, the control circuitry generates or retrieves from a database a manifest file for the supplemental content and transmits the manifest file to the client device. The client device then requests segments of the supplemental content according to the manifest file, and the control circuitry transmits each requested segment to the client device.

At 908, the control circuitry determines whether an indication that the streaming of the supplemental content to the client device has ended has been received. For example, during playback of the supplemental content, the client device may receive a user input to skip a portion of the supplemental content. An indication of such an input is transmitted by the client device to the content server. Alternatively or additionally, the control circuitry may determine that a threshold amount of time has passed since the last segment request was received from the client device, or may determine that the last segment of the supplemental content has been transmitted to the client device. If no such indication has been received ("No" at 908), then the control circuitry continues to stream the supplemental content in an ABR stream.

If an indication that streaming of the supplemental content to the client device has ended has been received ("Yes" at 908), then, at 910, the control circuitry resumes streaming of the interactive content to the client device using the first streaming protocol. In some cases, the supplemental content may be inserted within a scene or portion of the interactive content. In such cases, the control circuitry simply continues streaming of the content from the point at which the streaming of the interactive content was interrupted for insertion of the supplemental content. In other cases, the supplemental content may be inserted between scenes or portions of the interactive content. In such cases, the control circuitry may first identify a next portion of the interactive content to provide to the client device. For example, in a video game, a cutscene may be inserted between two levels of the video game. While the cutscene is being played back, the circuitry may use the time to load data for the next level and begin rendering portions of the next level for output. Once the cutscene is over, or when a user selection to skip the cutscene is received, the control circuitry begins streaming the new level to the client device.

The actions or descriptions of FIG. 9 may be used with any other embodiment of this disclosure. In addition, the actions and descriptions described in related to FIG. 9 may be done in suitable alternative orders or in parallel to further the purposes of this disclosure.

Figure 10:
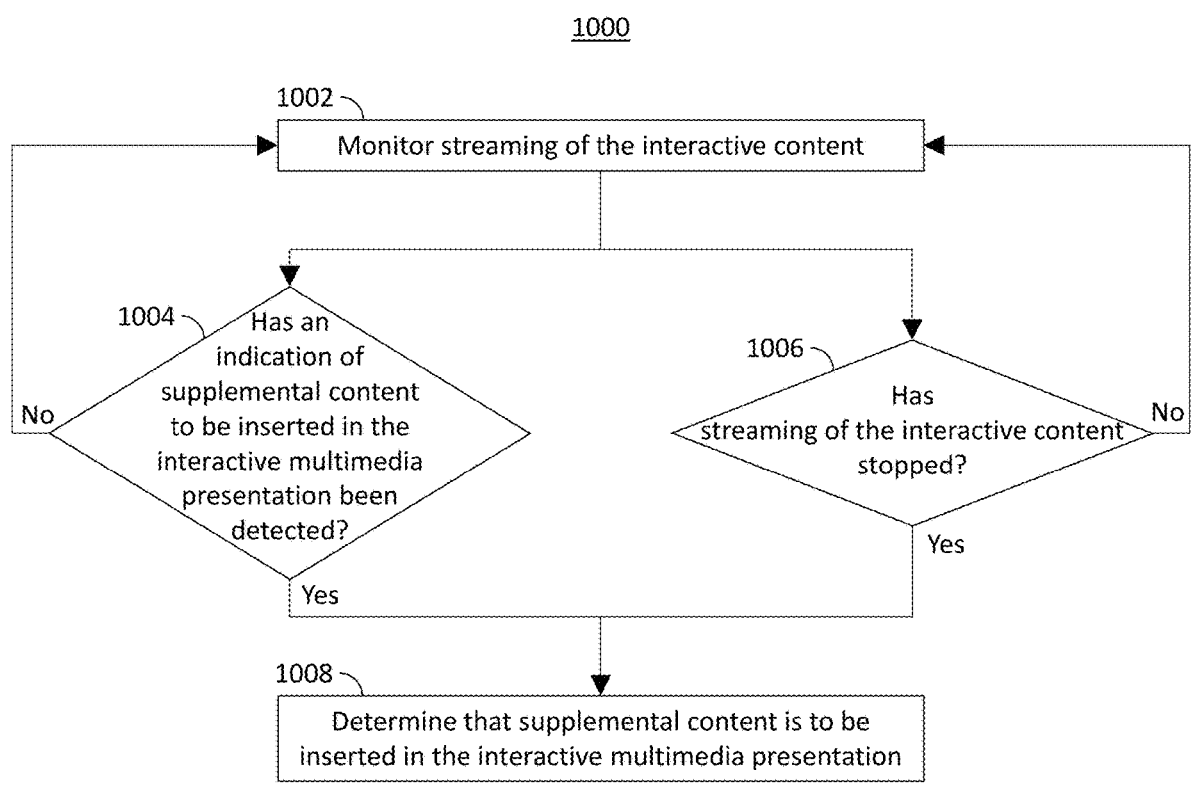
FIG. 10 is a flowchart representing a process for determining whether supplemental content is to be inserted into an interactive multimedia presentation, in accordance with some embodiments of the disclosure.

FIG. 10 is a flowchart representing a process 1000 for determining whether supplemental content is to be inserted into an interactive multimedia presentation, in accordance with some embodiments of the disclosure. Process 1000 may be implemented on control circuitry 500, 602, 638, 702, 802, or any combination thereof. In addition, one or more actions of process 1000 may be incorporated into or combined with one or more actions of any other process or embodiment described herein.

At 1002, the control circuitry monitors streaming of the interactive content. The control circuitry may scan the interactive content as it is transmitted to the client device for indications that supplemental content is to be inserted. For example, one or more frames or packets of interactive content may include metadata indicating a supplemental content insertion point. Alternatively, the interactive content processing circuitry may automatically pause output of the interactive content when a supplemental content insertion point has been reached.

At 1004, the control circuitry determines whether an indication of supplemental content to be inserted in the interactive multimedia presentation has been detected. If not ("No" at 1004), then the control circuitry continues to monitor streaming of the interactive content. At 1006, the control circuitry determines whether streaming of the interactive content has stopped. If not ("No" at 1006), then control circuitry continues to monitor streaming of the interactive content.

If an indication of supplemental content to be inserted into the interactive multimedia presentation has been detected ("Yes" at 1004) or if streaming of the interactive content has stopped ("Yes" at 1006), then, at 1008, the control circuitry determines that supplemental content is to be inserted in the interactive multimedia presentation.

The actions or descriptions of FIG. 10 may be used with any other embodiment of this disclosure. In addition, the actions and descriptions described in related to FIG. 10 may be done in suitable alternative orders or in parallel to further the purposes of this disclosure.

Figure 11:
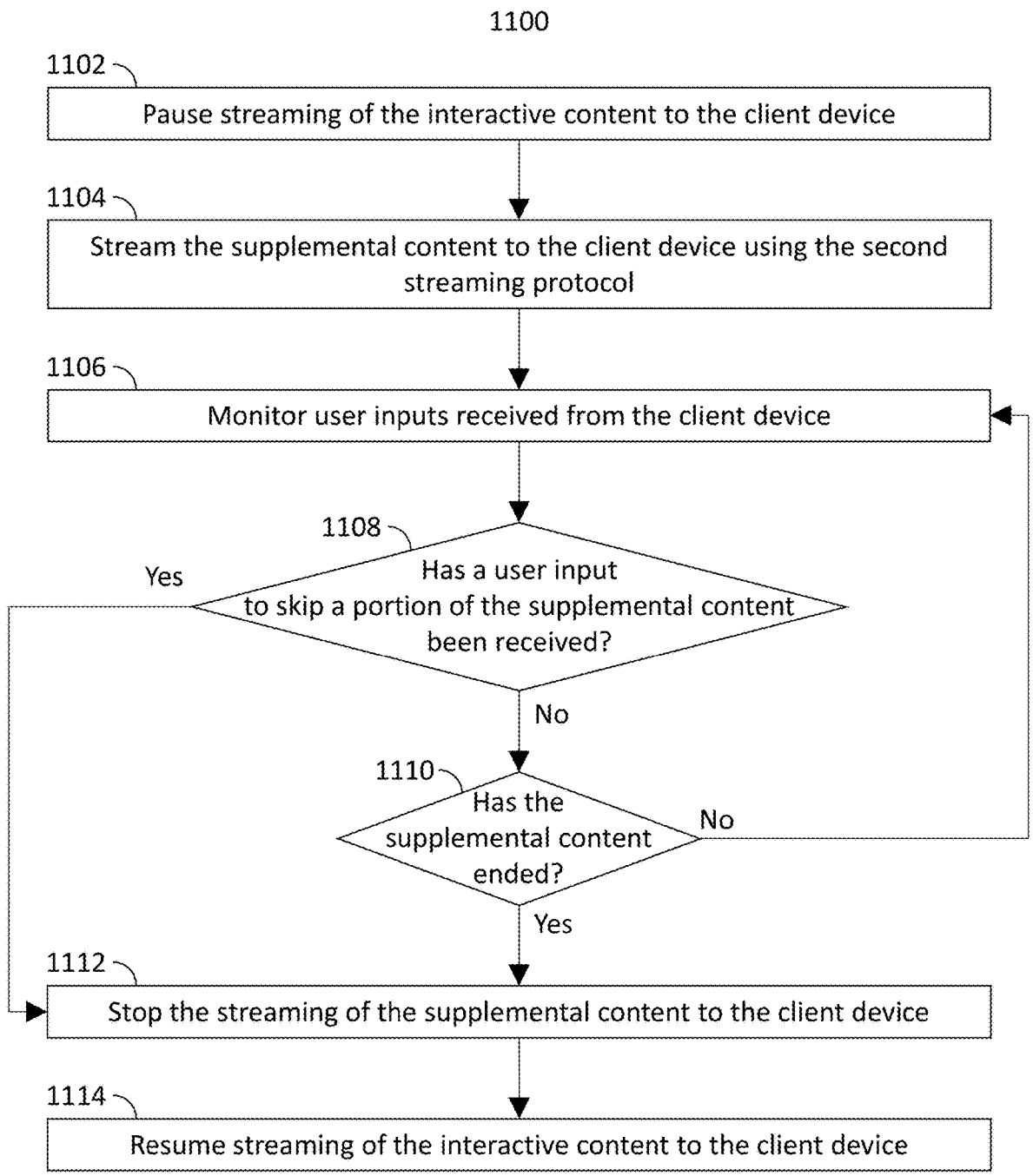
FIG. 11 is a flowchart representing a process for skipping a portion of supplemental content, in accordance with some embodiments of the disclosure.

FIG. 11 is a flowchart representing a process 1100 for skipping a portion of supplemental content, in accordance with some embodiments of the disclosure. Process 1100 may be implemented on control circuitry 500, 602, 638, 702, 802, or any combination thereof. In addition, one or more actions of process 1100 may be incorporated into or combined with one or more actions of any other process or embodiment described herein.

At 1102, the control circuitry pauses streaming of the interactive content to the client device and, at 1104, begins streaming the supplemental content to the client device using the second streaming protocol. At 1106, the control circuitry monitors user inputs received from the client device. For example, the client device may transmit a signal every time a user input is received. Alternatively, the client device may transmit a periodic signal (e.g., every 10 milliseconds) representing the state of one or more control inputs such as game controller buttons, keyboard keys, mouse movements, joystick movements, accelerometer data, inertial movement data, biometric data, etc. At 1108, the control circuitry determines whether a user input to skip a portion of the supplemental content has been received. For example, a signal representing user selection of a graphical control element corresponding to a skip command may be received. As another example, a specific control input or combination of inputs may be received that corresponds to a skip command. If no such input as been received ("No" at 1108), then, at 1110, the control circuitry determines whether the supplemental content has ended. For example, the control circuitry may monitor streaming of the supplemental content and determine when the supplemental content has stopped being output for streaming. If the supplemental content has not ended ("No" at 1110), then processing returns to 1106 and the control circuitry continues to monitor user inputs.

If a user input to skip a portion of the supplemental content has been received ("Yes" at 1108) or if the supplemental content has ended ("Yes" at 1110), then, at 1112, the control circuitry stops the streaming of the supplemental content to the client device and, at 1114, resumes streaming of the interactive content to the client device.

The actions or descriptions of FIG. 11 may be used with any other embodiment of this disclosure. In addition, the actions and descriptions described in related to FIG. 11 may be done in suitable alternative orders or in parallel to further the purposes of this disclosure.

Figure 12:
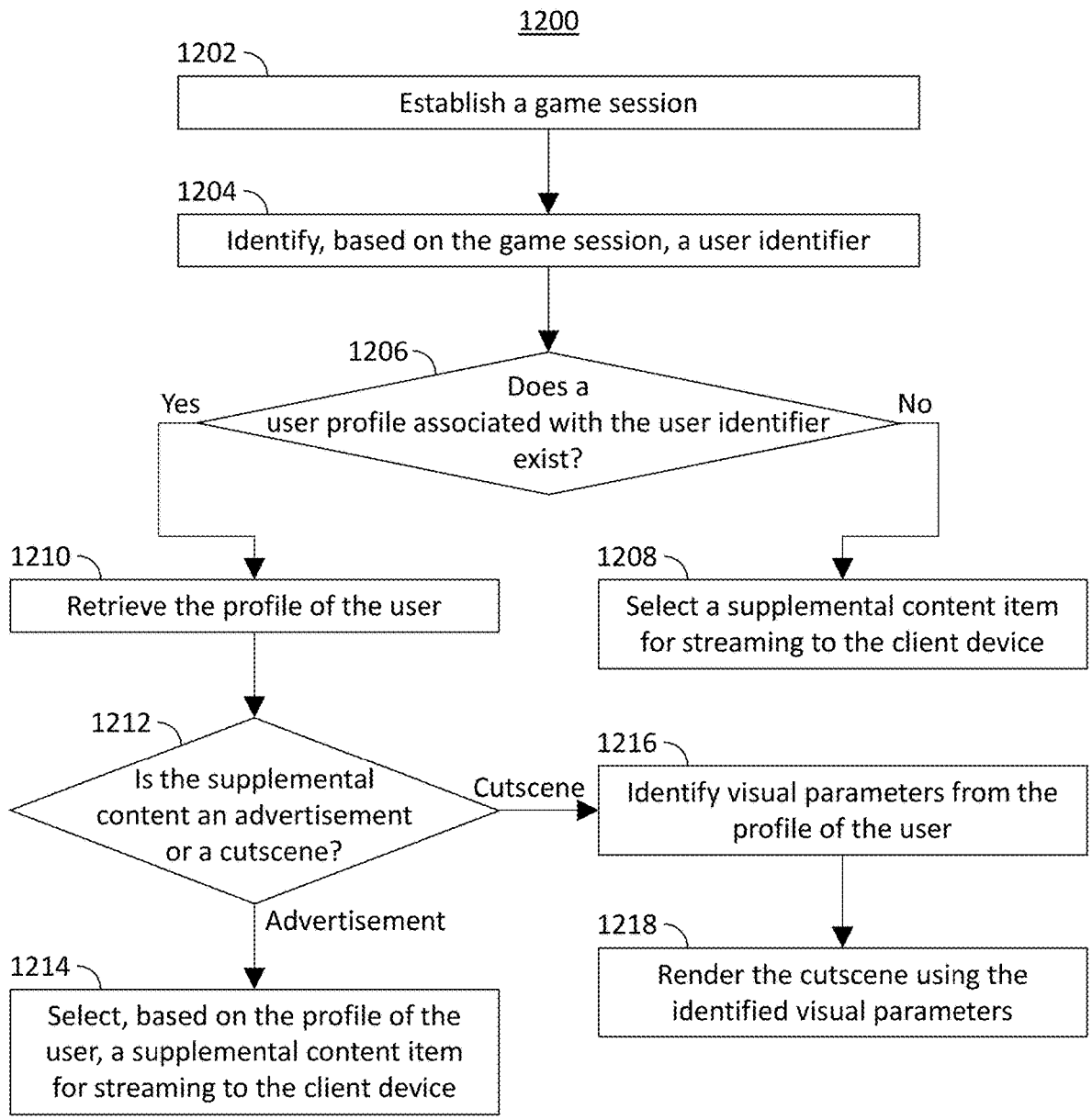
FIG. 12 is a flowchart representing a process for selecting supplemental content where the interactive multimedia presentation comprises a video game, in accordance with some embodiments of the disclosure.

FIG. 12 is a flowchart representing a process 1200 for selecting supplemental content where the interactive multimedia presentation comprises a video game, in accordance with some embodiments of the disclosure. Process 1200 may be implemented on control circuitry 500, 602, 638, 702, 802, or any combination thereof. In addition, one or more actions of process 1200 may be incorporated into or combined with one or more actions of any other process or embodiment described herein.

At 1202, the control circuitry established a game session. For example, the control circuitry may receive a new game session request from a client device. The control circuitry authenticates the requesting device and initializes a new game session for the authenticated device. Once initialized, the control circuitry may share an identifier of the new game session with the authenticated client device for use in requesting content or other data for the duration of the game session.

At 1204, the control circuitry identifies, based on the game session, a user identifier. For example, the client device may include a user identifier in the game session request. In some embodiments, the game session is initialized without any user data and a user of the client device must subsequently log in in order to access the video game content. Once authenticated, an identifier of the user (e.g., a user name, a user ID, or other data unique to the user) may be retrieved by the control circuitry from the game session.

At 1206, the control circuitry determines whether a user profile associated with the user identifier exists. The control circuitry may access a user profile database and search for data matching the user identifier. For example, the control circuitry may generate an SQL "SELECT" command based on the user identifier. If no result is returned from the database, the control circuitry determines that no user profile exists for the identified user ("No" at 1206) and, at 1208, selects a supplemental content item for streaming to the client device. For example, if the supplemental content is an advertisement, the control circuitry may select an advertisement at random or according to an ad campaign. If the supplemental content is a cutscene, the control circuitry identifies and selects the particular cutscene for the point within the video game at which the cutscene is to be inserted. This may be done on the basis on a cutscene identifier requested by the client device or identified in metadata of the video game content.

If the control circuitry determines that a profile associated with the user identifier exists ("Yes" at 1206), then, at 1210, the control circuitry retrieves the profile of the user. At 1212, the control circuitry determines what type of supplemental content is to be inserted. For example, a request for supplemental content received from the client device may indicate whether a cutscene or an advertisement is to be inserted. Alternatively, metadata of the video game content may include a flag or other indicator that identifies the type of supplemental content to be inserted.

If the supplemental content to be inserted is an advertisement, then, at 1214, the control circuitry selects, based on the profile of the user, a supplemental content item for streaming to the client device. For example, the supplemental content may be an advertisement. The control circuitry may retrieve data from the user profile, such as online shopping history, social media data, browsing history, or content consumption history. Based on the retrieved data, the control circuitry selects an advertisement for streaming to the client device in which the user of the client device is likely to be interested.

If the supplemental content to be inserted is a cutscene, then, at 1216, the control circuitry identifies visual parameters from the profile of the user. For example, the cutscene may include a visualization of the user's in-game avatar. In some video games, the user can select their avatar's initial appearance (e.g., height, weight, skin color, eye color, hair color, fictional race, etc.). The user can also acquire, through completing portions of the video game or through in-game purchases or other microtransactions, various equipment such as clothing, armor, weapons, etc. These parameters may be stored in the user's profile. At 1218, the control circuitry renders the cutscene using the identified visual parameters. The control circuitry uses the appearance of the user's avatar, as stored in the user's profile, to render a third-person visualization of the user's avatar. This may be a 3D rendering or a 2D rendering and may be of the entirety of the avatar's body or some portion thereof. The rendering can then be inserted into the cutscene to create a customized cutscene.

The actions or descriptions of FIG. 12 may be used with any other embodiment of this disclosure. In addition, the actions and descriptions described in related to FIG. 12 may be done in suitable alternative orders or in parallel to further the purposes of this disclosure.

Figure 13:
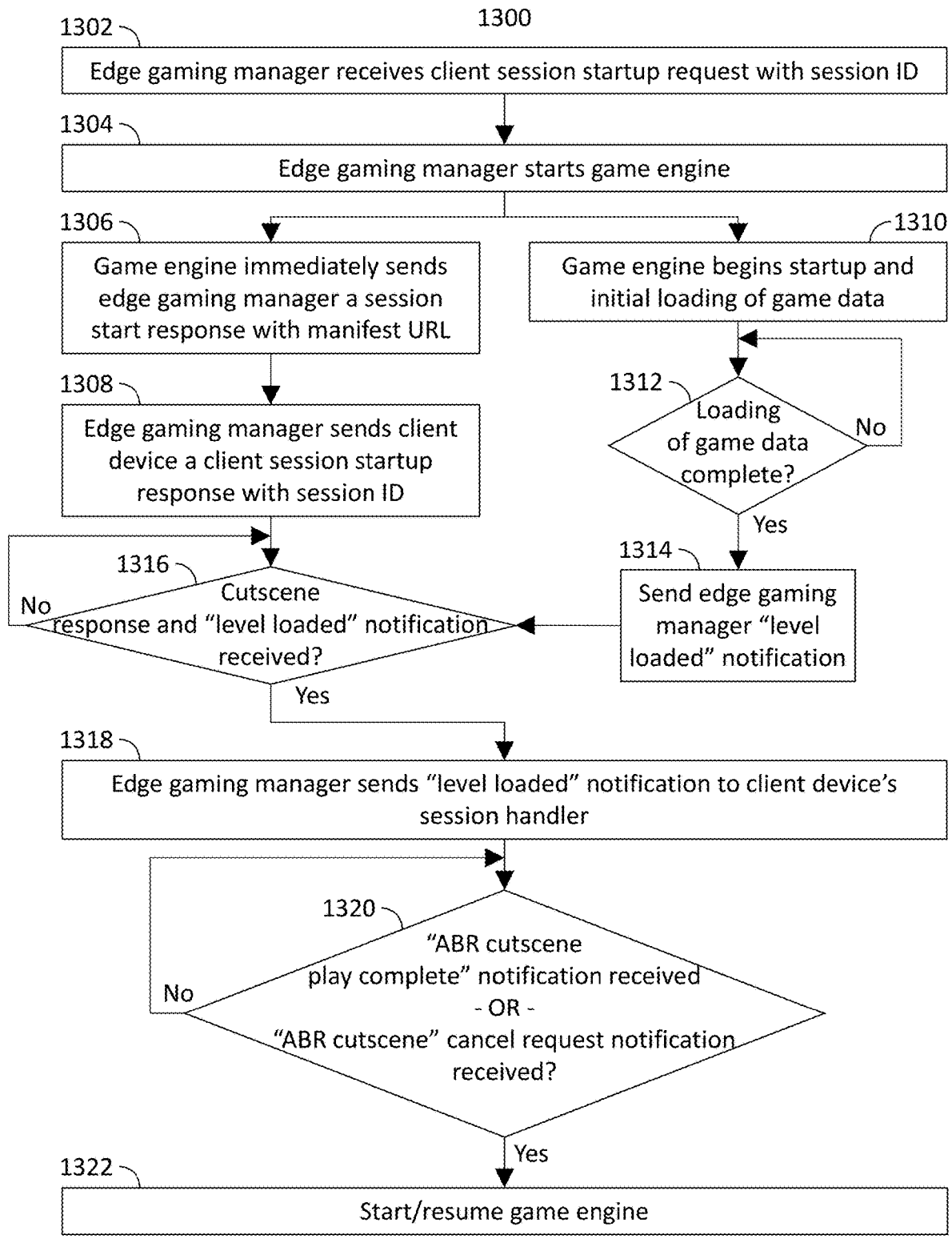
FIG. 13 is a flowchart representing a process for delivering a video game cutscene prior to start of the video game, in accordance with some embodiments of the disclosure.

FIG. 13 is a flowchart representing a process 1300 for delivering a video game cutscene prior to start of the video game, in accordance with some embodiments of the disclosure. Process 1300 may be implemented on control circuitry 500, 602, 638, 702, 802, or any combination thereof. In addition, one or more actions of process 1300 may be incorporated into or combined with one or more actions of any other process or embodiment described herein.

At 1302, control circuitry of the edge gaming manager, e.g., control circuitry 638 of edge content manager 636, receives a client session startup request with a session ID. The session ID may be received from the client device, or may be assigned by the game engine (e.g., interactive content server 600). In response, at 1304, the edge gaming manager starts the game engine. For example, the edge gaming manager transmits an initialization instruction to the game engine. At 1306, immediately upon starting, the game engine sends the edge gaming manager a session start response with a manifest URL. At 1308, the edge gaming manager sends the client device a session startup response with the session ID. This allows the client device to join and maintain connection to the game session.

Also upon starting, the game engine, at 1310, begins startup and initial loading of game data. At 1312, the game engine determines whether loading of game data is complete. If not, ("No" at 1312), then the game engine continues to wait until loading is complete. When loading is complete ("Yes" at 1312), then, at 1314, the game engine sends a "level loaded" notification to the edge gaming manager. The game engine may transmit a ready message once the necessary game data has completed loading. This may be game data for an entire level, a first portion of a level, a menu screen, or any other portion of the video game.

At 1316, the edge gaming manager determines whether a cutscene response was received and whether the "level loaded" notification was received, indicating that the game engine is initialized and ready for gameplay start. The client device may transmit an acknowledgement of receipt of the cutscene manifest URL, or an indication that ABR playback of the cutscene has successfully begun. If either of the cutscene response or the "level loaded" notification has not been received ("No" at 1316), then the edge gaming manager continues to wait until they are both received.

Once both messages have been received ("Yes" at 1316), at 1318, the edge gaming manager sends the "level loaded" notification to the client device, where it is directed to a session handler of the client device. At 1320, the edge gaming manager determines whether an "ABR cutscene play complete" notification has been received or if an "ABR cutscene cancel request" notification was received. These notifications may be transmitted by the client device in response to playback of the cutscene having completed naturally or in response to user selection of a skip command, respectively. If no notifications have been received ("No" at 1320), then the edge gaming manager waits while playback of the cutscene continues. If either notification has been received ("Yes" at 1320), then, at 1322, edge gaming manager instructs the game engine to start (in the case of a new game) or resume (in the case of a cutscene between game levels) the game.

The actions or descriptions of FIG. 13 may be used with any other embodiment of this disclosure. In addition, the actions and descriptions described in related to FIG. 13 may be done in suitable alternative orders or in parallel to further the purposes of this disclosure.

Figure 14:
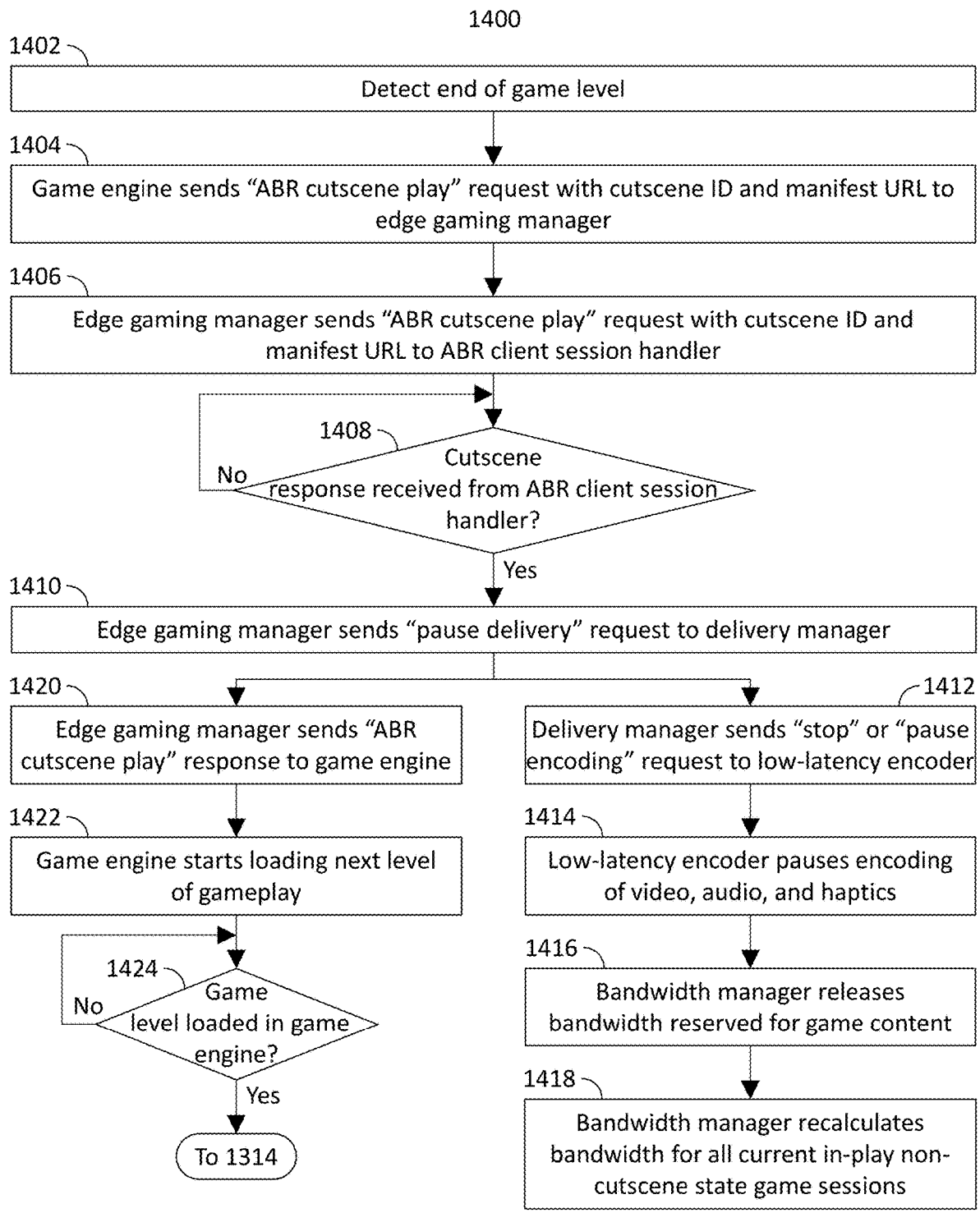
FIG. 14 is a flowchart representing a process for delivering a video game cutscene between levels of the video game, in accordance with some embodiments of the disclosure.

FIG. 14 is a flowchart representing a process 1400 for delivering a video game cutscene between levels of the video game, in accordance with some embodiments of the disclosure. Process 1400 may be implemented on control circuitry 500, 602, 638, 702, 802, or any combination thereof. In addition, one or more actions of process 1400 may be incorporated into or combined with one or more actions of any other process or embodiment described herein.

At 1402, the edge gaming manager detects that a game level has ended. For example, the game engine may pause output of game content or may include metadata in the game content indicating that the end of a level has been reached. At 1404, the game engine sends an ABR cutscene play request with a cutscene ID and manifest URL for the cutscene to the edge gaming manager. At 1406, the edge gaming manager sends the ABR cutscene play request, with the cutscene ID and manifest URL, to an ABR session handler at the client device.

Upon receipt of the "ABR cutscene play request," the ABR client session handler transmits a response, such as an acknowledgement (ACK) response, to the edge gaming manager. At 1408, the edge gaming manager determines whether such a response has been received from the ABR client session handler. If not ("No" at 1408), edge gaming manager continues to wait until the response is received. Once the response has been received ("Yes" at 1408), at 1410, the edge gaming manager sends a "pause delivery" request to a delivery manager. The delivery manager is a component of the game engine, such as streaming circuitry 604, that is responsible for streaming game content to the client device.

In response to receiving the "pause delivery" request, at 1412, the delivery manager sends a stop or pause encoding request to a low-latency encoder. The low-latency encoder may be part of streaming circuitry 604 or may be a separate component. At 1414, the low-latency encoder pauses encoding of video, audio, and haptics data for the video game. In response to this pause, at 1416, a bandwidth manager releases bandwidth reserved for game content in the current game session. The bandwidth manager may be a component of the game engine or the edge gaming manager that is responsible for allocating to and/or reserving portions of the available bandwidth [to] for each active game session. In order to provide the best quality content, bandwidth is only allocated to a game session that is actively streaming a high-bitrate low-latency stream. This allows the maximum amount of bandwidth to be shared among all active game sessions when needed. Thus, after releasing the bandwidth reserved for/allocated to the game content for the current game session, at 1418, the bandwidth manager recalculates bandwidth for all current in-play non-cutscene state game sessions. The amount of bandwidth reserved for/allocated to each current in-play non-cutscene state game session is then adjusted accordingly.

After sending the "pause delivery" request, at 1420, the edge gaming manager sends the "ABR cutscene play" response received from the client device to the game engine. In response, at 1422, the game engine starts loading data for the next level of gameplay. At 1424, the game engine determines whether the game level is loaded. If not ("No" at 1424), then the game engine waits until the game level is loaded. Once loaded ("Yes" at 1424), processing proceeds as in step 1314 of FIG. 13, above, wherein the game engine sends a "level loaded" notification to the edge gaming manager.

The actions or descriptions of FIG. 14 may be used with any other embodiment of this disclosure. In addition, the actions and descriptions described in related to FIG. 14 may be done in suitable alternative orders or in parallel to further the purposes of this disclosure.

Figure 15:
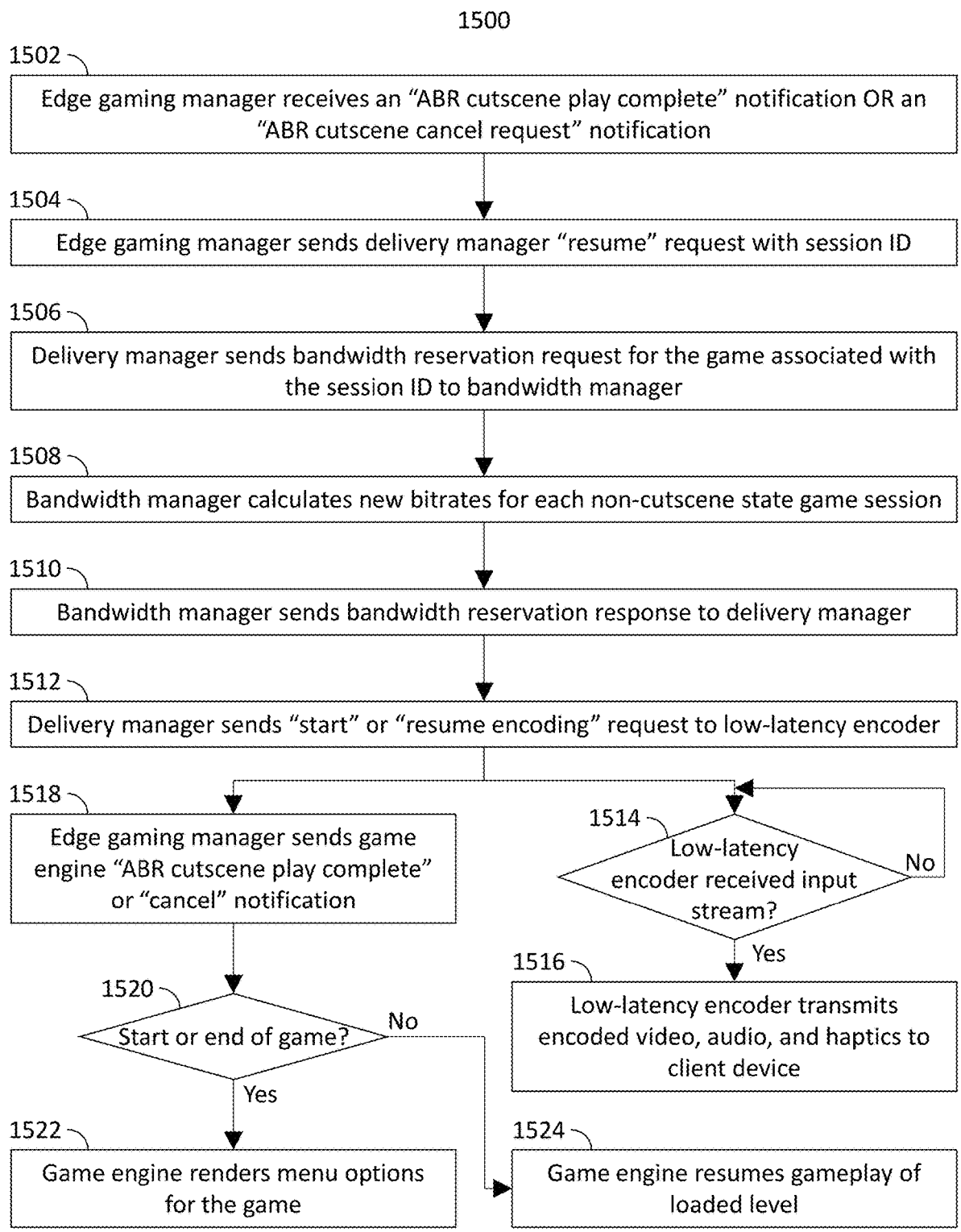
FIG. 15 is a flowchart representing a process for managing bandwidth usage during delivery of a video game cutscene, in accordance with some embodiments of the disclosure.

FIG. 15 is a flowchart representing a process for managing bandwidth usage during delivery of a video game cutscene, in accordance with some embodiments of the disclosure. Process 1500 may be implemented on control circuitry 500, 602, 638, 702, 802, or any combination thereof. In addition, one or more actions of process 1500 may be incorporated into or combined with one or more actions of any other process or embodiment described herein.

At 1502, the edge gaming manager receives an "ABR cutscene play complete" notification or an "ABR cutscene cancel request" notification. As discussed above, the client device or ABR client session handler may transmit a notification to the edge gaming manager when playback of the cutscene is complete or when the user has selected a command to skip the cutscene. At 1504, the edge gaming manager sends the delivery manager a "resume" request with the session ID for the current game session. In response, at 1506, the deliver manager sends a bandwidth reservation request for the game associated with the session ID to the bandwidth manager. At 1508, the bandwidth manager calculates new bitrates for each non-cutscene state game session, including the session corresponding to the session ID. At 1510, the bandwidth manager sends a bandwidth reservation response to the delivery manager, which then, at 1512, sends a "start" or "resume encoding" request to the low-latency encoder.

In response to the "start" or "resume encoding" request, at 1514, the low-latency encoder begins waiting for an input stream. If an input stream has not been received ("No" at 1514), then the low-latency encoder continues to wait for the game engine to provide an input stream. If an input stream has been received ("Yes" at 1514), then, at 1516, the low-latency encoder transmits encoded video, audio, and haptics to the client device.

At 1518, once the delivery manager sends the "start" or "resume encoding" request to the low-latency encoder, the edge gaming manager sends to the game engine an "ABR cutscene play complete" notification. If it is the start or end of a game ("Yes" at 1520), then, at 1522, the game engine renders menu options for the game. If it is not the start or end of a game ("No" at 1520), then, at 1524, the game engine resumes gameplay of the loaded level.

The actions or descriptions of FIG. 15 may be used with any other embodiment of this disclosure. In addition, the actions and descriptions described in related to FIG. 15 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for providing interactive cloud-based supplemental content for an interactive multimedia presentation, the method comprising:
    reserving system resources for use by a first interactive content engine for streaming an interactive multimedia presentation to a client device;
    determining that supplemental content is to be inserted into the interactive multimedia presentation streamed to the client device by the first interactive content engine;
    in response to determining that the supplemental content is to be inserted into the interactive multimedia presentation, releasing at least a portion of the system resources reserved for use by the first interactive content engine for streaming the interactive multimedia presentation;
    streaming, by a second interactive content engine using the released system resources, the supplemental content to the client device;
    upon receiving an indication that streaming of the supplemental content to the client device has ended, reserving the released system resources for use by the first interactive content engine; and
    resuming streaming, by the first interactive content engine using the reserved system resources, the interactive content.

2. The method of claim 1, further comprising:
    monitoring the streaming of the interactive content;
    wherein determining that supplemental content is to be inserted into the interactive multimedia presentation comprises detecting an indication of supplemental content to be inserted into the interactive multimedia presentation.

3. The method of claim 1, further comprising:
    monitoring the streaming of the interactive content;
    wherein determining that supplemental content is to be inserted into the interactive multimedia presentation comprises detecting, based on the monitoring, that the streaming of the interactive content has stopped.

4. The method of claim 1, wherein the interactive content comprises a video game and wherein the supplemental content comprises a cutscene.

5. The method of claim 1, wherein the supplemental content comprises an advertisement.

6. The method of claim 1, wherein the supplemental content is customized for a user of the client device, the method further comprising:
    retrieving an identifier of the user;
    accessing a profile associated with the user; and
    modifying a portion of the supplemental content based on the profile.

7. The method of claim 6, wherein:
    the interactive content is a video game;
    the supplemental content is a cutscene of the video game; and
    the portion comprises an avatar of the user,
    wherein modifying the portion of the supplemental content further comprises:
        determining, based on the profile associated with the user, physical characteristics of the avatar; and
        generating, based on the physical characteristics, the avatar for inclusion in the supplemental content.

8. The method of claim 1, wherein the system resources comprise an amount of bandwidth and an amount of processing resources.

9. The method of claim 1, further comprising:
receiving, during streaming of the supplemental content, a user input to skip a portion of the supplemental content; and
in response to receiving the user input to skip a portion of the supplemental content:
stopping the streaming of the supplemental content to the client device; and
resuming the streaming of the interactive content to the client device.

10. The method of claim 1, further comprising:
determining an amount of bandwidth available to the client device; and
encoding the supplemental content based on the amount of bandwidth available to the client device.

11. A system for providing interactive cloud-based supplemental content for an interactive multimedia presentation, the system comprising:
a network interface configured to allow communications between one or more servers and one or more client devices; and
control circuitry configured to:
reserve system resources for use by a first interactive content engine for streaming an interactive multimedia presentation to a client device of the one or more client devices;
determine that supplemental content is to be inserted into the interactive multimedia presentation streamed to the client device of the one or more client devices by the first interactive content engine;
in response to determining that the supplemental content is to be inserted into the interactive multimedia presentation, release at least a portion of the system resources reserved for use by the first interactive content engine for streaming the interactive multimedia presentation;
stream, by a second interactive content engine using the released system resources, the supplemental content to the client device;
upon receiving an indication that streaming of the supplemental content to the client device has ended, reserve the released system resources for use by the first interactive content engine; and
resume streaming, by the first interactive content engine using the reserved system resources, the interactive content.

12. The system of claim 11, wherein the control circuitry is further configured to:
monitor the streaming of the interactive content;
wherein the control circuitry configured to determine that supplemental content is to be inserted into the interactive multimedia presentation is further configured to detect an indication of supplemental content to be inserted into the interactive multimedia presentation.

13. The system of claim 11, wherein the control circuitry is further configured to:
monitor the streaming of the interactive content;
wherein the control circuitry configured to determine that supplemental content is to be inserted into the interactive multimedia presentation is further configured to detect, based on the monitoring, that the streaming of the interactive content has stopped.

14. The system of claim 11, wherein the interactive content comprises a video game and wherein the supplemental content comprises a cutscene.

15. The system of claim 11, wherein the supplemental content comprises an advertisement.

16. The system of claim 11, wherein the supplemental content is customized for a user of the client device, and wherein the control circuitry is further configured to:
retrieve an identifier of the user;
access a profile associated with the user; and
modify a portion of the supplemental content based on the profile.

17. The system of claim 16, wherein:
the interactive content is a video game;
the supplemental content is a cutscene of the video game; and
the portion comprises an avatar of the user,
wherein the control circuitry configured to modify the portion of the supplemental content is further configured to:
determine, based on the profile associated with the user, physical characteristics of the avatar; and
generate, based on the physical characteristics, the avatar for inclusion in the supplemental content.

18. The system of claim 11, wherein the system resources comprise an amount of bandwidth and an amount of processing resources.

19. The system of claim 11, wherein the control circuitry is further configured to:
receive, during streaming of the supplemental content, a user input to skip a portion of the supplemental content; and
in response to receiving the user input to skip a portion of the supplemental content:
stop the streaming of the supplemental content to the client device; and
resume the streaming of the interactive content to the client device.

20. The system of claim 11, wherein the control circuitry is further configured to:
determine an amount of bandwidth available to the client device; and
encode the supplemental content based on the amount of bandwidth available to the client device.

* * * * *